United States Patent
Ben-Chorin et al.

(10) Patent No.: US 8,599,226 B2
(45) Date of Patent: *Dec. 3, 2013

(54) DEVICE AND METHOD OF DATA CONVERSION FOR WIDE GAMUT DISPLAYS

(75) Inventors: Moshe Ben-Chorin, Rehovot (IL); Oded Ben-David, Rishon LeZion (IL)

(73) Assignee: Genoa Color Technologies Ltd., Hod Hasharon (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/372,022

(22) Filed: Feb. 13, 2012

(65) Prior Publication Data

US 2012/0139913 A1 Jun. 7, 2012

Related U.S. Application Data

(60) Continuation of application No. 12/244,427, filed on Oct. 2, 2008, now Pat. No. 8,115,787, which is a division of application No. 10/479,845, filed as application No. PCT/IL02/00410 on May 23, 2002, now Pat. No. 7,436,996.

(60) Provisional application No. 60/296,175, filed on Jun. 7, 2001, provisional application No. 60/332,058, filed on Nov. 23, 2001.

(51) Int. Cl.
*G09G 5/10* (2006.01)

(52) U.S. Cl.
USPC ............................ 345/690; 345/691; 345/692

(58) Field of Classification Search
USPC ............... 345/22, 38, 76, 82, 83, 589–591, 345/600–602, 629, 690–692; 382/254, 382/162–167, 218–224; 358/500, 518, 519, 358/520; 348/272, 506, 638–642, 656, 458, 348/422.1

See application file for complete search history.

(56) References Cited

U.S. PATENT DOCUMENTS

| 4,390,893 A | 6/1983 | Russell et al. |
| 4,751,535 A | 6/1988 | Myers |

(Continued)

FOREIGN PATENT DOCUMENTS

| JP | 09-289592 | * 11/1997 |
| JP | 2000-253263 | 9/2000 |

(Continued)

OTHER PUBLICATIONS

U.S. Appl. No. 60/255,914, filed Dec. 18, 2000, Ben-David.

(Continued)

*Primary Examiner* — Prabodh M Dharia
(74) *Attorney, Agent, or Firm* — Pearl Cohen Zedek Latzer Baratz, LLP

(57) ABSTRACT

A method and system for converting color image data (data outputting from element 202) from a, for example, three-dimensional color space format to a format usable by an n-primary display (206), wherein n is greater than or equal to 3. The system (converter 204) may define a two-dimensional sub-space having a plurality of two-dimensional positions, each position representing a set of n primary color values and a third, scaleable coordinate value for generating an n-primary display input signal (signal inputting toi display 206). Furthermore, the system may receive a three-dimensional color space input signal including out-of range pixel data not reproducible by a three-primary additive display, and may convert the data to side gamut color image pixel data suitable for driving the wide gamut color display.

22 Claims, 7 Drawing Sheets

(56) References Cited

U.S. PATENT DOCUMENTS

| | | | |
|---|---|---|---|
| 4,800,375 A | | 1/1989 | Silverstein et al. |
| 4,843,381 A | | 6/1989 | Baron |
| 4,843,573 A | | 6/1989 | Taylor et al. |
| 4,910,589 A | * | 3/1990 | Nagano et al. ................ 358/535 |
| 4,985,853 A | | 1/1991 | Taylor et al. |
| 5,067,152 A | * | 11/1991 | Kisor et al. ................ 348/422.1 |
| 5,343,311 A | * | 8/1994 | Morag et al. ................ 358/518 |
| 5,377,041 A | * | 12/1994 | Spaulding et al. ............ 358/518 |
| 5,416,890 A | | 5/1995 | Beretta |
| 5,428,465 A | * | 6/1995 | Kanamori et al. ............ 358/518 |
| 5,455,600 A | | 10/1995 | Friedman et al. |
| 5,473,736 A | * | 12/1995 | Young ........................... 345/593 |
| 5,485,288 A | * | 1/1996 | Kamei et al. .................. 358/530 |
| 5,504,821 A | * | 4/1996 | Kanamori et al. ............ 382/167 |
| 5,513,007 A | * | 4/1996 | Ito et al. ........................ 358/296 |
| 5,539,540 A | | 7/1996 | Spaulding et al. |
| 5,586,234 A | * | 12/1996 | Sakuraba et al. ............. 345/582 |
| 5,592,188 A | | 1/1997 | Doherty et al. |
| 5,650,942 A | | 7/1997 | Granger |
| 5,671,440 A | * | 9/1997 | Curry ........................... 345/656 |
| 5,691,827 A | * | 11/1997 | Kamei et al. .................. 358/530 |
| 5,751,385 A | | 5/1998 | Heinze |
| 5,760,929 A | * | 6/1998 | Ichikawa et al. ............... 358/2.1 |
| 5,835,099 A | | 11/1998 | Marimont |
| 5,867,286 A | | 2/1999 | Lee et al. |
| 5,870,530 A | | 2/1999 | Balasubramanian |
| 5,872,898 A | | 2/1999 | Mahy |
| 5,892,891 A | | 4/1999 | Dalal et al. |
| 5,907,629 A | | 5/1999 | Funt et al. |
| 5,995,165 A | | 11/1999 | Oh |
| 5,999,153 A | | 12/1999 | Lind et al. |
| 6,018,237 A | | 1/2000 | Havel |
| 6,058,207 A | | 5/2000 | Tuijn et al. |
| 6,097,367 A | | 8/2000 | Kuriwaki et al. |
| 6,128,022 A | * | 10/2000 | Dillinger ...................... 345/591 |
| 6,144,362 A | * | 11/2000 | Kawai ........................... 345/629 |
| 6,147,720 A | | 11/2000 | Guerinot et al. |
| 6,198,512 B1 | | 3/2001 | Harris |
| 6,220,710 B1 | | 4/2001 | Raj et al. |
| 6,231,190 B1 | | 5/2001 | Dewald |
| 6,236,406 B1 | | 5/2001 | Li |
| 6,246,396 B1 | | 6/2001 | Gibson et al. |
| 6,256,073 B1 | | 7/2001 | Pettitt |
| 6,259,430 B1 | | 7/2001 | Riddle et al. |
| 6,262,710 B1 | | 7/2001 | Smith |
| 6,262,744 B1 | | 7/2001 | Carrein |
| 6,266,165 B1 | * | 7/2001 | Huang et al. .................. 358/520 |
| 6,280,034 B1 | | 8/2001 | Brennesholtz |
| 6,324,006 B1 | | 11/2001 | Morgan |
| 6,360,008 B1 | | 3/2002 | Suzuki et al. |
| 6,373,595 B1 | | 4/2002 | Semba et al. |
| 6,400,843 B1 | | 6/2002 | Shu et al. |
| 6,438,264 B1 | | 8/2002 | Gallagher et al. |
| 6,459,425 B1 | | 10/2002 | Holub et al. |
| 6,577,073 B2 | | 6/2003 | Shimizu et al. |
| 6,611,356 B1 | * | 8/2003 | Shimizu et al. ................ 358/1.9 |
| 6,707,938 B2 | | 3/2004 | de Queiroz et al. |
| 6,727,959 B2 | | 4/2004 | Eskin |
| 6,751,348 B2 | * | 6/2004 | Buzuloiu et al. .............. 382/165 |
| 6,788,309 B1 | * | 9/2004 | Swan et al. .................... 345/629 |
| 6,828,981 B2 | | 12/2004 | Richardson |
| 6,870,523 B1 | | 3/2005 | Ben-David et al. |
| 6,958,780 B1 | * | 10/2005 | Kawai ........................... 348/458 |
| 7,103,215 B2 | * | 9/2006 | Buzuloiu et al. .............. 382/165 |
| 7,327,876 B2 | | 2/2008 | Hoshuyama |
| 2001/0017627 A1 | | 8/2001 | Marsden et al. |
| 2003/0137610 A1 | | 7/2003 | Ohsawa |

FOREIGN PATENT DOCUMENTS

| | | |
|---|---|---|
| JP | 2000-338950 | 12/2000 |
| WO | WO 95/10160 | 4/1995 |
| WO | WO 97/42770 | 11/1997 |
| WO | WO 01/95544 | 12/2001 |
| WO | WO 02/99557 | 5/2002 |
| WO | WO 02/50763 | 6/2003 |

OTHER PUBLICATIONS

U.S. Appl. No. 09/710,895, filed Jun. 7, 2000, Ben David et al.

Ajito et al., "Color Conversion Method for Multiprimary Display Using Matrix Switching", Optical Review, Springer-Verlag, BE, vol. 8, No. 3, May 1, 2001, pp. 191-197, XP019353885, ISSN: 1349-9432.

Supplementary European Search Report of Application No. 02735931 dated Jul. 4, 2008.

Jack, Keith, "YCbCr to RGB Consideration", Intersil Application Note (1997): 1-2.

International Search Report of Application No. PCT/IL02/00410 dated Dec. 4, 2002.

Wyble and Berns, "A critical view of Spectral Models Applied to Binary Color Printing", Color Research and Application, vol. 25, 2000, pp. 4-19.

Imai, Francisco H., "Spectral reproduction from scene to hardcopy, Part 1—Multi-spectral acquisition and spectral estimation using a Trichromatic Digital Camera System associated with absorbtion filters", Munsell Color Science Laboratory, Rochester Institute of Technology, 2000.

Rosen et al., "Spectral Reproduction from Scene to Hardcopy II: Image Processing", Munsell Color Science Laboratory, RIT—Proceedings of SPIE vol. 4300 (2001), pp. 33-41.

Pointer, M.R., "The Gamut of Real Surface Colors", Color Research & Application, 5(3): 144-155, 1980.

Ajito et al., "Expanded Color Gamut Reproduced by Six-Primary Projection Display", Proceedings of SPIE, vol. 3954 (2000), pp. 130-137.

Ajito et al., "Multiprimary color display for liquid crystal display projectors using diffraction grating", Optical Eng. 38(11): 1883-1888 (Nov. 1999).

Wyszecki and Stiles, "Color Science: Concepts and Methods", Quantative Data and Formulae, $2^{nd}$ Edition, 1982, pp. 179-183.

Keith, "Video Demystified", 3rd Edition, LLH Technology Publishing, 2001, pp. 17-19.

Shimizu, "Scrolling Color LCOS for HDTV Rear Projection", SID 01 Digest, pp. 1072-1075, 2001.

Yajima et al., "Wide Color Gamut System", Proceeding of New Foundations for Video Technology, The SMPTE Advanced Television and Electronic Imaging Conference, Feb. 10-11, 1995, pp. 112-119.

Recommendation ITU-R BT.1361, Worldwide Unified Colorimetry and Related Characteristics of Future Television and Imaging Systems (1998), pp. 1-13.

International Standard IEC 61966-2-4, Multimedia Systems and Equipment—Colour Measurement and Management, Part 2-4: Colour Management—Extended-Gamut YCC Colour Space for Video Applications—xvYCC, (2006), pp. 1-18.

U.S. Office Action for U.S. Appl. No. 12/244,427 dated Jun. 16, 2011.

U.S. Office Action for U.S. Appl. No. 10/479,845 dated May 16, 2007.

U.S. Final Office Action for U.S. Appl. No. 10/479,845 dated Jan. 29, 2008.

* cited by examiner

DEVICE AND METHOD OF DATA CONVERSION FOR WIDE GAMUT DISPLAYS

CROSS-REFERENCE TO RELATED APPLICATIONS

This application is a continuation application of U.S. patent application Ser. No. 12/244,427, filed Oct. 2, 2008 now U.S. Pat. No. 8,115,787, which is a divisional application of U.S. patent application Ser. No. 10/479,845, filed Dec. 8, 2003 now U.S. Pat. No. 7,436,996, which is a National Phase Application of PCT International Application No. PCT/IL02/00410, International Filing Date May 23, 2002, which in turn claims priority of U.S. Provisional Patent Application No. 60/296,175, filed Jun. 7, 2001 and U.S. Provisional Patent Application No. 60/332,058, filed Nov. 23, 2001, all of which are incorporated herein by reference in their entirety.

FIELD OF THE INVENTION

The invention is related generally to conversion and processing of data for display devices and monitors, more specifically, to methods, systems and devices for converting data to drive color displays.

BACKGROUND OF THE INVENTION

Standard computer monitors and TV displays are typically based on three additive primaries: red, green, and blue, collectively denoted RGB. These monitors may not be able to display many colors perceived by humans, since they are limited in the range of color they are capable of displaying. FIG. 1A schematically illustrates a chromaticity diagram as is known in the art. The closed area in a shape of horseshoe represents the chromaticity of colors that can be seen by humans. For each chromaticity, described as a point on the two-dimensional plane, different levels of brightness are possible, thus constructing a three-dimensional color space. The points on the border of the horseshoe, known as the spectrum locus, correspond to monochromatic excitations in the range from 400 nm to 780 nm as marked. A straight line closing the horseshoe from below, between the extreme monochromatic excitation at the long and short wavelengths, is named the purple line. All colors discernible by human eye are inside this closed area, which is called the color gamut of the eye. The triangular area enclosed by the color gamut in FIG. 1A represents the range of colors that can be produced by a standard RGB monitor. The area of the color gamut outside the RGB triangle indicates that many colors seen by humans are not discernible on standard monitors.

Existing display devices can be divided into two groups, namely, direct view devices and projection devices. The direct view devices group includes CRT, LCD, LED and other displays. In direct view devices, each display is composed of three-color sub-pixels, namely RGB, which are physically located at the screen. The color image is created by the viewer's visual system, which mentally integrates the colored light arriving from spatially neighboring sub-pixels to give a full color impression.

The light emission mechanism may be different in the different types of devices. In a CRT display, an electron beam accelerated by a scanning electron gun cause the different color phosphors at the screen to emit visible light. In LED devices, different color LED pixels are directly driven by electric current to emit light. In both cases the strength of the excitation determines the intensity of the emitted light. The input data modulates the intensity of the excitation of different pixels to create a desired image.

In LCD devices, color is created by filtering white light through an array of red, green and blue optical filters, which correspond to red, green and blue sub-pixels. The transparency of different color is modulated by an array of LC elements, which is placed juxtaposed and in registry with the color filter sub-pixel array. The transparency of the LC array cells, which control the intensity of respective sub-pixels, is modulated by controlling the voltage applied to the cells. These voltages are modulated in accordance with the input data to create the desired image.

Projection display systems create images by projecting light on a viewing screen. There are generally two types of projection display systems, namely, simultaneous displays and sequential displays. Simultaneous projection display systems are based on projecting light of all three primaries simultaneously onto to the viewing screen, whereby color combinations are perceived by spatial integration of the colors by the visual system of the viewer. Sequential projection display systems project separate images of the different primary colors onto the screen sequentially, at a sufficiently high frequency so that the human eye can perceive color combinations by temporal integration of the primary color images.

Standard video data is typically transferred in YCbCr or RGB related formats. The data is encoded, either digitally or analogously. Color is represented in a three-dimensional space suitable for presentation on a three-primaries monitor or display. The input data in YCbCr format is translated, using a conversion matrix, to corresponding RGB data. If RGB input data is used the matrix conversion is not required, and the input RGB data is passed directly to the monitor. Signals responsive to the RGB data are used to drive the three-primaries display. The RGB data includes R, G and B signal components (channels): the R signal component represents the red primary; the G signal component represents the green primary; and the B signal component represents the blue primary. Three multipliers and/or one-dimensional look-up tables, one for each of the RGB channels, are used to adjust color temperature and other responses of the system. Certain processes can also be applied to the original YCbCr data, controlling the visual appearance using the YCbCr coordinates. For example, the Y channel might be manipulated in order to control the brightness and the contrast of the image. Alternatively, the Cb and Cr data can be manipulated to control the color saturation of the final image. A user of the display may perform such manipulations and adjustments, e.g., by adjusting the "brightness", "contrast" and "color" of a display monitor.

As described above, existing display monitors reproduce colors only within a limited portion of the full color gamut of the eye. Therefore, to improve image reproduction quality and richness, there is a need for a display monitor capable of reproducing a wider color gamut, including color ranges beyond the enclosed triangular area in FIG. 1A.

SUMMARY OF THE INVENTION

The range of colors that are reproduced by display monitors can be expanded using a monitor with more than three primary colors. It has been demonstrated by the inventors that a monitor with more than three primaries in accordance with the invention produces improved color images, spanning a significantly wider color gamut than that of conventional three-primary display systems.

Embodiments of the present invention provides systems, methods and devices for converting image data in three-primary video formats, for example, YCC, RGB or related formats, into a format suitable for driving n-primary displays, wherein n is greater than or equal to three, to reproduce a video image, for example, a wide color gamut video image. Further, systems, methods and devices according to embodiments of the invention may use various non-linear algorithms to achieve optimal performance of wide gamut display systems in processing images at video speeds.

An aspect of the invention provides a method of converting color image data into a form usable by a wide gamut color display. The method includes receiving a three-dimensional color space input signal representing color image pixel data, which data may include out-of-range pixel data not reproducible by a three-primary additive display. The method further includes converting the three-dimensional color space input data into a converted input signal, which represents wide gamut color image pixel data suitable for driving the wide gamut color display, wherein the wide gamut data includes data corresponding to at least some of the out-of-range pixel data. In an embodiment of this aspect of the invention, the wide gamut color display is an n-primary display, wherein n>3, and the converted input signal represents n-primary color image data suitable for driving the n-primary color display. In an embodiment of this aspect of the invention, the wide gamut input signal includes more than three, respective channels, each channel representing image data corresponding to one primary color in a set of more than three, respective, primary colors reproducible by the more-than-three-primary color display.

Further, in an embodiment of the invention, converting the three-dimensional input signal includes defining a conversion color space having a plurality of positions, each position corresponding to a distinct linear combination of the more than three primary colors, the linear combination representing a distinct color combination in the three-dimensional-color space, and, for each pixel of the three-dimensional color space input pixel data, constructing a corresponding wide gamut pixel based on the linear combination of primaries corresponding to the position of the pixel in the conversion color space.

Another aspect of the invention provides a method of converting color image data from a three-dimensional color space format to a format usable by an n-primary display, wherein n is greater than or equal to three. The method according to this aspect of the invention includes defining a two-dimensional sub-space having a plurality of two-dimensional positions, each position representing a set of n primary color values and a third, scaleable coordinate value, the set of primary color values and the scaleable coordinate value corresponding to a distinct color combination in the three-dimensional color space, receiving an input signal representing color image data including a plurality of pixels in the three-dimensional color space, decomposing the three-dimensional color space data of each the pixel into a two-dimensional sub-space component, which determines the position of the color of the pixel in the two-dimensional sub-space, and a third, scaling component, and generating an n-primary display input signal representing n-primary input data for each the pixel based on the set of n primary color values and the third, scaleable coordinate value at the position of the two-dimensional sub-space component of the pixel in the two-dimensional sub-space, scaled by the third, scaling component of the pixel. According to an embodiment of this aspect of the invention, the two-dimensional sub-space includes a predetermined number of positions spanning a predetermined range of color combinations of the three-dimensional color space. Further, according to this aspect of the invention, the n-primary display input signal may include n, respective channels, each channel representing image pixel data corresponding to one of a set of n primary colors reproducible by the n-primary display. The third, scaleable coordinate value of each position in the two-dimensional sub-space is responsive to the level of saturation of the color corresponding to each the position. Alternatively, the third, scaleable coordinate value of each position in the two-dimensional sub-space is responsive to the level of brightness of each the position.

Further, in accordance with embodiments of the invention, the method may include storing the set of n primary color values and third, scaleable component of all colors represented by the two-dimensional sub-space in at least one look-up-table (LUT) having a plurality of entries, each entry containing the set of n primary color values and the third, scaleable coordinate value of a corresponding position in the two-dimensional sub-space. The n primary color values of each entry of the at least one LUT may be computed to comply with the condition that a linear combination of the n primaries based on the computed values yields a maximum saturation level for predetermined hue and brightness levels. Alternatively, the n primary color values of each the entry of the at least one LUT may be computed to comply with the condition that a linear combination of the n primaries based on the computed values yields a maximum brightness for predetermined chromaticity coordinates. Alternatively, the n primary color values of each the entry of the at least one LUT may be computed to comply with the condition that a linear combination of the n primaries based on the computed values yields an optimal spectral match for predetermined chromaticity coordinates. In some embodiments of the invention, the at least one LUT includes at least one two-dimensional LUT.

In accordance with some embodiments of the invention, generating an n-primary input signal includes retrieving from the at least one LUT the set of n primary color values and the third, scaleable coordinate value at the position of the two-dimensional sub-space component of the pixel in the two-dimensional sub-space, scaling the retrieved third, scaleable coordinate value based on the third, scaling component of the decomposed input data, to produce a scaled third component, normalizing the retrieved n primary color values based on the scaled third component to produce n normalized primary color values, and generating the n-primary display input signal based on the n normalized primary color values.

A further aspect of the invention provides device for converting color image data to a form usable by a wide gamut color display, the device including means for receiving an input signal, in a three-dimensional color space, representing three-dimensional color image pixel data including out-of-range pixel data not reproducible by a three-primary additive display, means for converting the three-dimensional color space input data into wide color gamut image pixel data corresponding to at least some of the out-of-range pixel data, and means for generating, based on the wide color gamut image pixel data, a wide color gamut input signal suitable for driving the wide gamut color display. In embodiments of this aspect of the invention, the wide gamut color display includes a more-than-three-primary color display and wherein the wide gamut input signal represents more-than-three-primary color image pixel data suitable for driving the more-than-three-primary color display. Additionally, in some embodiments of this aspect of the invention, the wide gamut input signal includes more than three, respective channels, each channel representing image pixel data corresponding to one primary color in a set of more than three, respective, primary colors reproducible by the more-than-three-primary color display. Further, in some embodiments of this aspect of the invention, the means for converting the three-dimensional input signal includes means for defining a conversion color space having a plurality of positions, each position corresponding to a distinct linear combination of the more than three primary colors, the linear combination representing a distinct color combination in the three-dimensional-color space, and means for constructing, for each pixel of the three-dimensional color space input pixel data, a corresponding wide gamut pixel based on the linear combination of primaries corresponding to the position of the pixel in the conversion color space.

An additional aspect of the invention provides a device for converting color image data from a three-dimensional color space format to a format usable by an n-primary display, wherein n is greater than or equal to three, the device including means for defining a two-dimensional sub-space having a plurality of two-dimensional positions, each position representing a set of n primary color values and a third, scaleable coordinate value, the set of primary color values and the scaleable coordinate value corresponding to a distinct color combination in the three-dimensional color space, means for receiving an input signal representing color image data including a plurality of pixels in the three-dimensional color space, means for decomposing the three-dimensional color space data of each the pixel into a two-dimensional sub-space component, which determines the position of the color of the pixel in the two-dimensional sub-space, and a third, scaling component, and means for generating an n-primary display input signal representing n-primary input data for each the pixel based on the set of n primary color values and the third, scaleable coordinate value at the position of the two-dimensional sub-space component of the pixel in the two-dimensional sub-space, scaled by the third, scaling component of the pixel.

In embodiments of this aspect of the invention, the two-dimensional sub-space includes a predetermined number of positions spanning a predetermined range of color combinations of the three-dimensional color space. Additionally or alternatively, the n-primary display input signal may include n, respective channels, each channel representing image pixel data corresponding to one of a set of n primary colors reproducible by the n-primary display. In some embodiment of the invention, the third, scaleable coordinate value of each position in the two-dimensional sub-space is responsive to the level of saturation of the color corresponding to each the position. In other embodiment of the invention, the third, scaleable coordinate value of each position in the two-dimensional sub-space is responsive to the level of brightness of each the position.

A device in accordance with embodiments of the invention may include at least one look-up-table (LUT) having a plurality of entries, each entry containing the set of n primary color values and the third, scaleable coordinate value of a corresponding position in the two-dimensional sub-space, the at least one LUT storing the set of n primary color values and third, scaleable component of all colors represented by the two-dimensional sub-space. The n primary color values of each entry of the at least one LUT may be computed to comply with the condition that a linear combination of the n primaries based on the computed values yields a maximum saturation level for predetermined hue and brightness levels. Alternatively, the n primary color values of each the entry of the at least one LUT may be computed to comply with the condition that a linear combination of the n primaries based on the computed values yields a maximum brightness for predetermined chromaticity coordinates. Alternatively, the n primary color values of each the entry of the at least one LUT may be computed to comply with the condition that a linear combination of the n primaries based on the computed values yields an optimal spectral match for predetermined chromaticity coordinates. In some embodiments of the invention, the at least one LUT includes at least one two-dimensional LUT.

In some embodiments of the invention, the means for generating an n-primary input signal includes means for retrieving from the at least one LUT the set of n primary color values and the third, scaleable coordinate value at the position of the two-dimensional sub-space component of the pixel in the two-dimensional sub-space, means for scaling the retrieved third, scaleable coordinate value based on the third, scaling component of the decomposed input data, to produce a scaled third component, means for normalizing the retrieved n primary color values based on the scaled third component to produce n normalized primary color values, and means for generating the n-primary display input signal based on the n normalized primary color values.

In some embodiments of the device of the invention, the three-dimensional color space includes a RGB color space. In other embodiments of the invention, the three-dimensional color space includes a YCbCr color space.

Yet another aspect of the invention provides a color display system including a device for converting color image data as described above, and a color display arranged to receive the wide color gamut or n-primary display input signal defined above, and to reproduces a color image based on the wide color gamut or n-primary display input signal. The color display may include a wide color gamut display, or an n-primary color display.

BRIEF DESCRIPTION OF THE DRAWINGS

The invention will be understood more fully from the following detailed description of embodiments of the invention, taken in conjunction with the accompanying drawings in which.

DETAILED DESCRIPTION OF EMBODIMENTS OF THE INVENTION

Embodiments of the invention provide systems, methods and devices for encoding wide gamut data in three-primary formats, for example, YCC or RGB related formats, and translating the encoded three-primary values into a format suitable for driving an n-primaries color display, for example, a wide gamut display, wherein n is greater than or equal to three. Systems, methods and devices in accordance with embodiments of the invention may use non-linear algorithms, as described in detail below, to achieve optimal performance in processing images at video speed. Various aspects of the invention are described, with reference to specific embodiments that provide a thorough understanding of the invention; however, it will be apparent to one skilled in the art that the present invention is not limited to the specific embodiments and examples described herein. Further, to the extent that certain details of the systems and methods described herein relate to known aspects of digital image and video processing, such details may have been omitted or simplified for clarity.

Figure 1A:
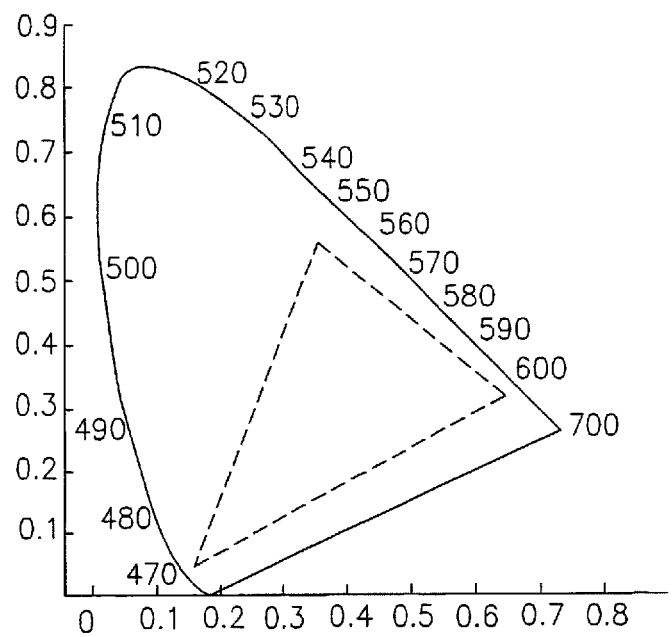
FIG. 1A is a schematic illustration of a chromaticity diagram, as is known in the art, enclosing a prior art RGB gamut.
Figure 1B:
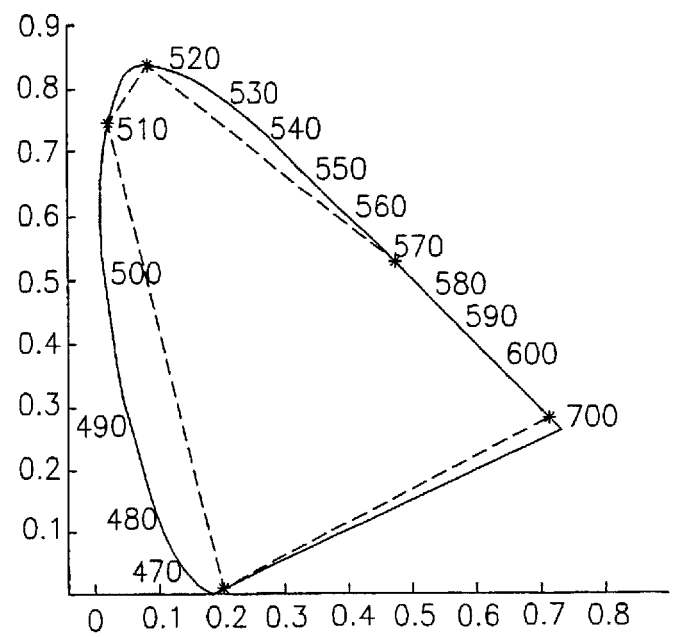
FIG. 1B is a schematic illustration of a chromaticity diagram enclosing a wide color gamut in accordance with an exemplary embodiment of the invention.

According to an embodiment of the invention, the range of colors that can be reproduced by a display system may be expanded using a monitor with more than three primaries. FIG. 1B schematically illustrates a chromaticity diagram, as is known in the art, enclosing a wide color gamut in accordance with an exemplary embodiment of the invention. The six-sided shape in FIG. 1B represents an expanded gamut produced by a six-primaries display in accordance with an exemplary embodiment of the invention.

A monitor with more than three primaries can be constructed to reproduce improved color images. Examples of such monitors are disclosed in U.S. patent application Ser. No. 09/710,895, entitled "Device, System And Method For Electronic True Color Display", filed Nov. 14, 2000, assigned to the assignee of the present application, the entire disclosure of which is incorporated herein by reference. Embodiments of monitors based on more than three primaries are also disclosed in International Application PCT/IL01/00527, entitled "Device, System and Method For Electronic True Color Display," filed Jun. 7, 2001, and published Dec. 13, 2001 as WO 01/95544, assigned to the assignee of the present application, the entire disclosure of which is incorporated herein by reference. While the methods and systems disclosed in these patent applications may be used in embodiments of the present invention, the system and method of the present invention may also be embodied in conjunction with other n-primary color display technology, wherein n is greater than or equal to three.

A direct view display system according to an embodiment of the invention includes more than three sub-pixels within each pixel, for example, more than three different color LEDs (in a LED display), more than three different color phosphors (in a CRT display), or more than three different color filters and respective LCD cells (in an LCD display). The input data, which is received in, for example, RGB or YCbCr format or other related formats, in either digital or analog form, is converted to values that represent the intensity of each of the more-than-three primaries for each of the pixels and signals corresponding to these new values are generated to drive the different sub-pixel elements of the display, e.g., by modulating the current applied to LED elements (in LED systems), by modulating the voltage applied to LC elements (in LCD systems), or by modulating a scanning electron beam (in CRT systems). Embodiments of the system and method of the present invention may receive and manipulate data in formats other than RGB or YCbCr formats.

Simultaneous projection display systems in accordance with the invention may be based on spatially modulating colored light of more than three primaries and projecting it onto the display screen. The spatial modulation can be performed, for example, by a liquid crystal spatial modulator used in conjunction with a source of polarized light. Alternatively, the spatial modulation can be performed by a digital micro-mirror device (DMD), such as that available from Texas Instruments (USA), which allows the use of non-polarized light. Other suitable types of devices for performing spatial modulation may also be used in conjunction with the invention.

Spatial modulation in accordance with embodiments of the invention may be based on either analog (gray-level) or binary gradations, depending on the type of modulator device being used. For example, Nematic liquid crystal modulators, such as those available from CRL Opto (United Kingdom), or Kopin Inc. (USA), allow for analog gray levels, while Ferroelectric liquid crystal modulators, such as those available from Micropix Technologies (United Kingdom) or LightCaster™ from Displaytech (USA), as well as DMD devices, are binary devices that do not allow gray-level graduation. If a binary modulator device is used for spatial modulation, gray levels may be achieved by controlling the duration of the illumination and/or the intensity of the light incident on the spatial modulator.

In a simultaneous projection devices in accordance with embodiments of the invention, the light received from a white light source is divided into more than three primary color components, using filters or dichroic mirrors or other optical means, and each color channel is spatially modulated according to the image data by a spatial light modulator. The different channels are subsequently combined and projected simultaneously on the viewing screen in registry. The intensity of light of a given primary color illuminating each pixel is modulated, for example, by controlling the voltage applied to a corresponding LC cell of the spatial light modulator of the given primary color.

In sequential projection display systems according to an embodiment of the invention, a spatial light modulator as described above is illuminated sequentially by light of more than three different primary colors, whereby the resultant primary color images are projected sequentially onto the viewing screen. The primary color images are projected sequentially at a sufficiently high frequency so that a human visual system can temporally integrate the different color images into a full color image. The colored light for the different primaries can be created by illuminating the spatial light modulator with white light, sequentially filtered through different color filters placed on a fast rotating wheel, or by a set of light emitting diodes (LEDs) or lasers devices of different colors that sequentially illuminate the spatial light modulator. The intensity of illumination for each primary color may be modulated, for example, by controlling the relative duration of the illumination, as in binary type spatial light modulators, or by modifying the intensity of the colored light as in gray-level type spatial light modulators.

In an embodiment of the system and method of the invention, the input data received in YCbCr or RGB or other formats, either digital or analog, is converted to values corresponding to the brightness of each of the more-than-three primaries for each of the pixels. These values may be arranged in a number of channels, each channel corresponding to one of the primary colors, and a signal corresponding to a full frame image is loaded onto the display device. In simultaneous projection type devices, full frame data for each primary may be loaded to a corresponding spatial light modulator. In sequential projection type display systems, the data for different primary color images may be loaded sequentially to the spatial light modulator, based on a timing signal synchronized with the rate at which sequential primary color illuminations are switched.

As described above, standard video data is typically transferred in YCbCr or RGB related formats, and is either digitally or analogically encoded. Colors are thus represented in a three-dimensional space suitable for presentation on a three-primaries monitor or display. The input data in YCbCr format is translated, using a conversion matrix, to corresponding RGB data. If RGB data is used as input, there is no need for matrix conversion and the input RGB data can be passed directly to the monitor. Signals responsive to the RGB data are used to drive the three-primaries display. The RGB data includes R, G and B signal components (channels): the R signal component represents the red primary; the G signal component represents the green primary; and the B signal component represents the blue primary. Three multipliers and/or one-dimensional look-up tables, one for each of the RGB channels, are used to adjust color temperature and other responses of the system. Certain processes can also be applied to the original YCbCr data, controlling the appearance using the YCbCr coordinates. For example, the Y channel might be manipulated in order to control the brightness and the contrast of the image. Alternatively, the Cb and Cr data can be manipulated to control the color saturation of the final image. A user of the display may perform such manipulations and adjustments, e.g., by adjusting the "brightness", "contrast" and "color" of a display monitor.

In multi-primary displays with more than three primaries, according to an embodiment of the invention, the RGB data flow may not be straightforward because the R, G and B signals may not relate directly to the n primaries. Unless the data is originally provided in terms of $P_1 \ldots P_n$, i.e., a distinct channel for each primary, the standard YCC or RGB data formats must be converted to a format suitable for n-primaries (n>3) display devices. If a video image is to be reproduced, the process of converting the YCC or RGB input data into corresponding n-primaries data should be performed sufficiently fast to run at video speeds. The conversion process should also maintain consistent color reproduction properties, in the sense that an input signal from a source designed for standard RGB monitors would yield a similar appearance regardless of the set of primaries used.

Embodiments of the system and method of the present invention include several algorithms for transforming three-dimensional RGB data to a format suitable for n-primaries (n>3) displays. Most of the algorithms are based on analyzing the RGB data to find one or more triads of primaries that can represent the data. The values for those primary triads are calculated using matrix multiplication, analogous to the matrix multiplication used for standard RGB displays. In some versions of this method, "artificial primaries" with a pre-defined composition of display primaries are used to create the triads. Some of the methods suggested are colorimetric in the sense that the input data is converted to XYZ or other absolute color spaces before the conversion to display primaries is performed. Other methods merely transform the RGB data to corresponding values of the primaries, without reference to an absolute colorimetric space. In all the methods discussed above, data transformation is linear, i.e., the RGB values are transformed linearly to the corresponding primary values.

Still, the methods described above may not cover the entire gamut of the n-primary displays for which they are used. For n>3 displays, using a combination of all n primaries should yield better results, in measurable terms, than any combination of three out of the n primaries. For example, by using all n primaries in certain regions of the display gamut, it is possible to reproduce a higher brightness than with any combination of only three primaries. However, since the methods described above are typically based on defining a triad of primaries (real or artificial), those methods may not provide optimal results.

Figure 2:
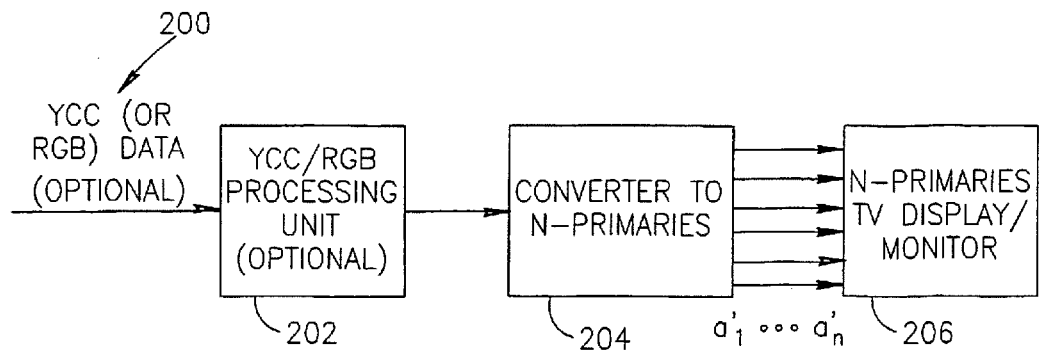
FIG. 2 is a schematic block diagram of a system in accordance with an exemplary embodiment of the invention.

According to an exemplary embodiment of the system and method of the present invention, illustrated schematically in FIG. 2, input data from a video source 200, which may contain data outside the gamut of standard RGB displays, is converted by a converter 204 into a format suitable for use in an n-primary display 206, for example, a wide color gamut display having more than three primary colors. In an embodiment of the invention, the input data may be in YCbCr format and may be processed in the YCbCr format (or equivalent/related formats) until being received by n-primaries converter 204. In alternate embodiments, data in other formats may be accepted and manipulated by the system and method of the invention. This is in contrast to prior systems and methods wherein color data processing algorithms are applied exclusively to RGB data. In an embodiment of the invention, converter 204 receives input data capable of representing wide gamut data, avoiding clipping of data outside the standard RGB color gamut, and converts the data to n-primaries data, where n may be greater than three. In a further embodiment, color enhancement or processing may be performed, allowing control over, for example, hue, saturation and/or brightness, and/or any other desirable aspect, as is known in the art. In an alternative embodiment of the invention, an optional YCC/RGB processing unit 202 is used to manipulate the input data prior to the processing by converter 204, for example, to control image parameters such as brightness, contrast, tint, and other parameters.

Referring to FIG. 2, input data available for presentation on a TV monitor, e.g. by Digital Video Disk (DVD) or Digital Video Broadcasting (DVB), may be stored in an encrypted format, such as an MPEG-2 format or any other suitable digital video format known in the art. The video data in, for example, MPEG2 format may include, for example, temporally and spatially compressed YCbCr data, as is known in the art. The YCbCr data may include a brightness/color difference representation of RGB signals. After the DVD or DVB data is decrypted, an MPEG decoder converts the MPEG file or stream to a sequence of YCbCr frames. At this point, the Y component of the data is at full spatial resolution, and the Cb, Cr components of the data are at a reduced spatial resolution, as is known in the art. The Cb and Cr components may be spatially interpolated, using methods known in the art, to obtain decoded YCbCr data at full spatial resolution.

As is known in the art, the Y component represents non-linear gamma-corrected brightness and the Cb, Cr coordinates contain the chroma data. The Y component has a nominal range, for example, an eight-bit range of 16-235, where a value of Y=16 represents zero brightness and a value of Y=235 represents full white brightness. Similarly, the Cb and Cr components are defined by a standard range, for example, the range of 16-240, where zero chroma is mapped to a value of 128, and the mapped values of 16 and 240 correspond to chroma values of −0.5 and +0.5, respectively. In alternate embodiments of the invention, other values and other data formats and limits may be used.

The YCbCr values are typically multiplied by a matrix to convert them to standard RGB data. For example, in Standard Definition TV, the following matrix transformation may be used:

$$\begin{pmatrix} R' \\ G' \\ B' \end{pmatrix} = \begin{pmatrix} 1 & 0 & 1.371 \\ 1 & -0.336 & -0.698 \\ 1 & 1.732 & 0 \end{pmatrix} \begin{pmatrix} Y \\ Cb - 128 \\ Cr - 128 \end{pmatrix}$$

This matrix transformation is defined for NTSC 1953 primaries with a CIE illuminant C as a white point, and is described in Keith Jack, Video Demystified, $3^{rd}$ Edition, LLH Technology Publishing 2001, incorporated herein by reference. It should be noted, however, that this matrix conversion is also suitable for other types of currently available CRT monitors, with primaries and white point different from those of the NTSC 1953 definition. R'G'B' represent a non-linearly transformed RGB values. High Definition (HD) TV sets and monitors use different phosphors and a D65 white point reference, and therfore, in the case of High Definition TV, the transformation is as follows:

$$\begin{pmatrix} R' \\ G' \\ B' \end{pmatrix} = \begin{pmatrix} 1 & 0 & 1.540 \\ 1 & -0.183 & -0.459 \\ 1 & 1.816 & 0 \end{pmatrix} \begin{pmatrix} Y \\ Cb - 128 \\ Cr - 128 \end{pmatrix}$$

It will be appreciated by persons skilled in the art that other suitable transformations may be used in conjunction with the present invention, depending on specific parameters of the system being used.

When transforming the YCbCr data into non-linear R'G'B' values, the resulting values are typically within a predefined range, typically the range of 16-235, wherein a value of 16 corresponds to zero brightness of a primary and a value of 235 corresponds to the full brightness ("standard white") of the primary. R'G'B' values lower than 16 correspond to "negative brightness" of the respective primaries and therefore represent "out of gamut" colors. R'G'B' including primary values larger than 235 represent points which are brighter than standard white, for example, image points originating from shining objects.

Figure 3:
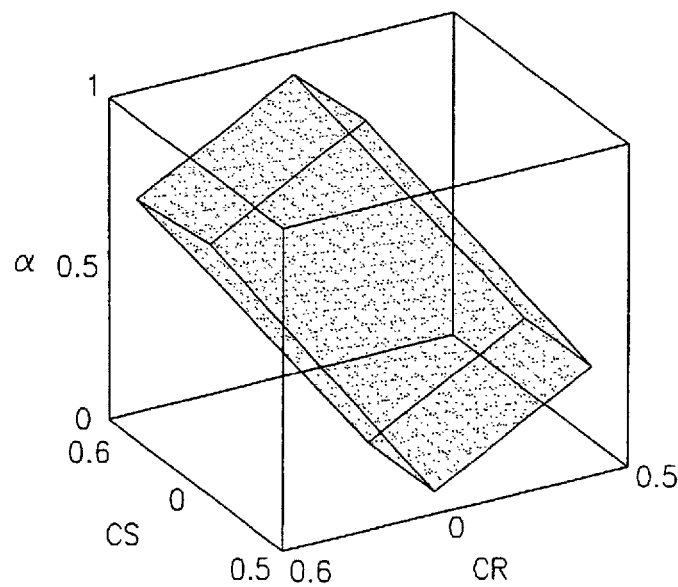
FIG. 3 is a schematic depiction of an exemplary RGB space contained in a YCbCr space in accordance with an embodiment of the invention.

FIG. 3 schematically illustrates an exemplary RGB space contained in a YCbCr space. As shown in FIG. 3, the YCbCr color space is much wider than the RGB color space used by current monitors. Thus, there are many color codes in the YCbCr space which translate to RGB values outside the standard range, e.g., the 16-235 range. For example, the YCbCr value [36 111 174] in standard definition TV translates to an RGB value [100 10 7], where both green and blue are below 16, namely negative.

Conventional RGB displays reject RGB values that fall outside of certain ranges; for example, in some systems values outside the 16-235 range may simply be rejected. However, these rejected values can be used by a wide gamut display such as, for example, the displays described in PCT Publication WO 01/95544, entitled "Device, System and Method For Electronic True Color Display," published Dec. 13, 2001, and in U.S. patent application Ser. No. 09/710,895 entitled "Device, System And Method For Electronic True Color Display", filed on Nov. 14, 2000, the disclosures of both of which are incorporated herein by reference. After converting the YCbCr data to non-linear RGB form (R'G'B'), some of the RGB values may be negative or above the maximum value for standard white, or otherwise out of the useful range of standard RGB monitors. These values are collectively referred to herein as "out-of-range" values. As explained above, out-of-range values in existing 3-primary display systems are clipped, e.g., replaced by the nearest in-range values, because such color combinations have no meaning and cannot be reproduced in the context of such conventional systems, for example, standard RGB based systems. However, in accordance with an embodiment of the system and method of the present invention, the out-of-range values are not clipped; rather, they are further manipulated to extract the color data for reproduction by the wide gamut display. Alternatively, in an embodiment of the invention, the data flow and processing may be handeled in YCbCr format, which is capable of represnting wide gamut information.

Alternatively, in an embodiment of the invention, the data may be received in the form of analog YPbPr signals, or any other known analog signal form, whereby the analog signals are first converted to corresponding digital signals before further processing.

Figure 4:
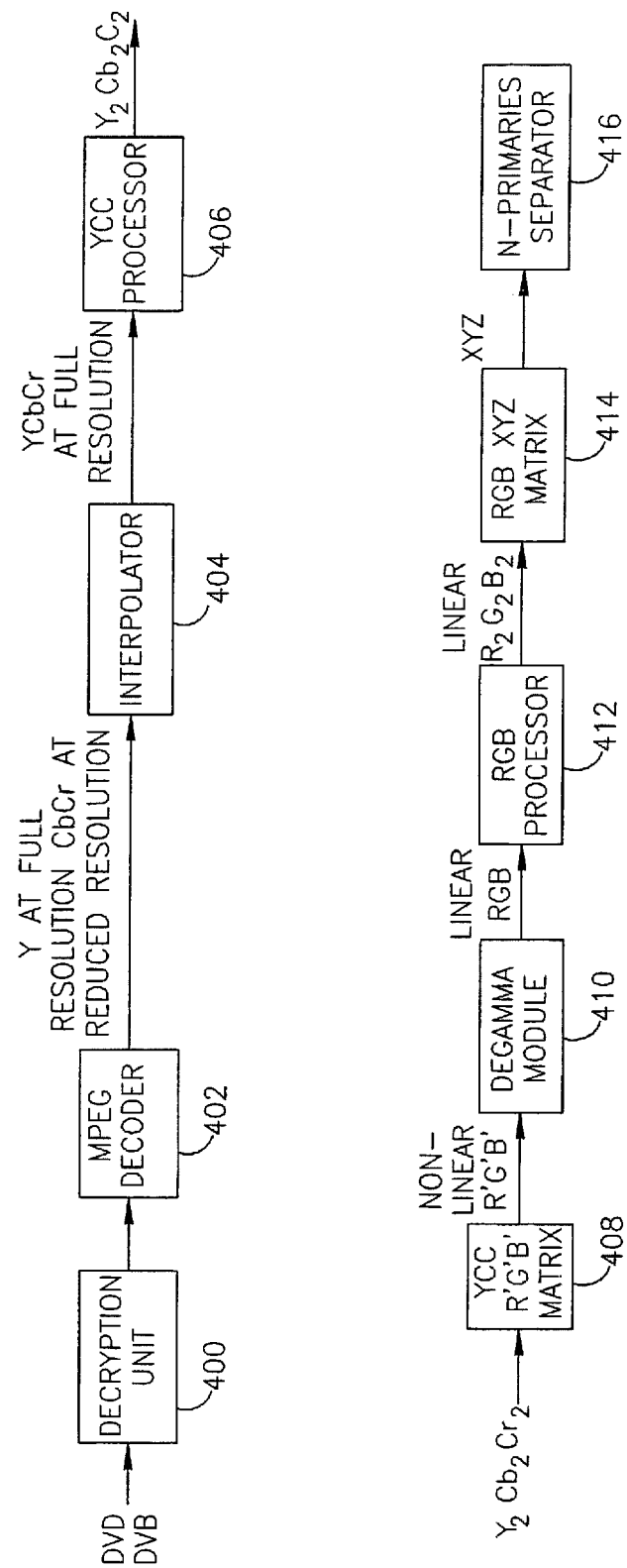
FIG. 4 is a schematic block diagram depicting the flow of data and processing steps of a system and method in accordance with an exemplary embodiment of the invention.

FIG. 4 is a schematic flow chart depicting the flow of data and processing steps in a system and method according to an embodiment of the present invention. These steps may be executed by a combination of hardware and/or software in convereter 204 (FIG. 2), and/or in any other part of the image reproduction and display system being used, taking into consideration specific design requirements. It should be appreciated that, in alternate embodiments, a different sequence of data flow and data processing steps may be used, in accordance with specific system requirements. Input data, such as DVD or DVB or other data format, is decrypted by a decryption unit 400 to form a corresponding digital video format stream, for example, a MPEG2 stream. The video stream is decoded by a MPEG decoder 402 into a sequence of YCbCr data. Both the decryption and the MPEG decoding may be performed by hardware components, such as those found in DVD players and DVB set-off boxes, or by software components, such as the DirectX filters available from Microsoft, Inc., U.S.A., or by a combination of software and hardware, as is typically the case in DVD players of personal computers ("PCs"). This may be followed by spatial interpolation by an interpolator 404 to increase the resolution of the compressed CbCr data components up to the resolution of the Y data component, as is known in the art. In certain embodiments, various adjustment operations may be performed on the YCbCr data, for example, changing brightness and contrast, e.g., on the Y channel, or increasing saturation, for example, by multiplying the Cb and Cr components by a constant, or by applying one dimensional ("1-D") look-up-tables ("LUTs"). In alternate embodiments, the adjustment operations may be performed at a later stage. These processes may be performed by a YCC processor 406, whose function may be implemented using, for example, hardware components, such as Application Specific Integrated Circuits ("ASICs") adapted for TV applications, for example, the ASICs available from Sony, Philips, Mitsubishi and other manufacturers, or using software components adapted for TV applications as are known in the art, or using any combination of hardware and software suitable for digital video applications, for example, PC video applications. The processed YCbCr data may be converted to non-linear R'G'B' form, for example, by applying to the data a conversion matrix 408, as discussed above, which may be be implemented using ASIC components such as those discussed above, or using other means. For example, the conversion matrix function can be programmed into a programable gate arrays (FPGA), such as those available from Altera, Xilinx or others, or implemented using a digital signal processor (DSP), such as those available from Texas Instruments (TI), or by analog circuts (e.g., amplifiers, inverters and adders), as are known in the art, which perform equivalent functionality on corresponding analog YPbPr inputs. After conversion, a degamma module 410 may be used transfrom the non-linear R'G'B' data into the corresponding linear RGB data. For example, in HDTV systems, the degamma process used may be based on a gamma value of 1/0.45, as demonstarted by the following function table:

| RGB values | R', G', B' < −0.0812 | −0.0812 << R', G', B' << 0.0812 | R'G'B ≥ 0.0812 |
|---|---|---|---|
| DeGamma Function | $R = -(((-R' + 0.099)/1.099)^{1/0.45})$<br>$G = -(((-G' + 0.099)/1.099)^{1/0.45})$<br>$B = -(((-B' + 0.099)/1.099)^{1/0.45})$ | $R = R'/4.5$<br>$G = G'/4.5$<br>$B = B'/4.5$ | $R = ((R' + 0.099)/1.099)^{1/0.45}$<br>$G = ((G' + 0.099)/1.099)^{1/0.45}$<br>$B = ((B' + 0.099)/1.099)^{1/0.45}$ |

In alternate embodiments, other suitable de-gamma functions, as are known in the art, may be applied. The de-gamma process can be performed by a 1-D LUT, which accepts a non-linear input, L', as an index to a memory table, and retrieves a corresponding linear value, L, from a table box corresponding to index L. At this stage, manipulation at the RGB level may be performed by an RGB processor 412, for example, using three 1-D LUTs, one for each color. The linear (optionally modified) RGB data, which typically includes data outside the standard RGB gamut, is transformed into a CIE (Commission Internationale de L'Eclairage) XYZ color space, e.g., using matrix multiplication performed by a multiplication matrix 414. For example, assuming a system with Recommendation ITU-R BT.709-3 (Rec. 709) primaries and assuming D65 white, the conversion from linear RGB to XYZ is given by the following matrix:

$$\begin{pmatrix} X \\ Y \\ Z \end{pmatrix} = \begin{pmatrix} 0.412453 & 0.357580 & 0.180423 \\ 0.212671 & 0.75160 & 0.072169 \\ 0.019334 & 0.119193 & 0.950227 \end{pmatrix} \begin{pmatrix} R \\ G \\ B \end{pmatrix}$$

At this stage, all color data is represented in the CIE XYZ space, which is a device-independent space. The transformation above references the RGB values to the Rec. 709 standard primaries, resulting in a general appearance similar to that expected according to the Rec. 709 standard. In other embodiments of the invention, the conversion matrix may be defined by NTSC 1953 primaries as follows:

$$\begin{pmatrix} X \\ Y \\ Z \end{pmatrix} = \begin{pmatrix} 0.606937 & 0.173509 & 0.200263 \\ 0.298939 & 0.586625 & 0.114436 \\ 0.000000 & 0.066099 & 1.115748 \end{pmatrix} \begin{pmatrix} R \\ G \\ B \end{pmatrix}$$

The output multiplication matrix 414 is converted into signals driving the specific n-primaries display, for example, using a separator 416, described in more detail below, which may or may not be an intergral part of a display system designed and constructed in accordance with an embodiment of present invention.

In further embodiments of the invention, a set of RGB primaries and white point that yield an even wider color gamut may be used as reference to the RGB values, for example, RGB primaries at the edge of the chromaticity curve may be used as reference. When such a wider gamut set of primaries and white point is used, colors generally appear more saturated compared to the case of a standard RGB reference set. According to an aspect of the invention, the wide gamut display can be utilized to reproduce all or most of the color data available, with little or no clipping and without significant limitation.

It should be appreciated that, in alternate embodiments of the invention, other suitable conversion methods, e.g., other converstion matrices, may be used.

In an alternate embodiment of the invention, the process described above can be simplified by using the YCbCr space as the colorimetric space. According to this embodiment, non-linear YCbCr data is converted to linear YCbCr, and the linear YCbCr data is used as wide gamut data. The linear YCbCr data may be referenced to a predefined set of primaries, which are used as a colorimetric reference space. In this alternate embodiment, the functions of conversion matrix 408, RGB processor 412, and multiplication matrix 414 may be eliminated, whereby the output of YCC processor 406 is received directly by de-gamma module 410 and the output of de-gamma module 410 may be received directly by n-primaries separator 416.

It should be noted that, in 3-primaries CRT display systems, non-linear ROB data is fed directly into the CRT electron guns of the display. Therefore, in CRT systems, the physics of the electron guns and their resultant phosphors emissions determine the parameters of conversion of the RGB values into visible color. In 3-primaries LCD displays, the non-linear RGB data is processed by a gamma module, which includes correction for Liquid Crystal (LC) voltage. The color data is not converted to XYZ format, as described above, and the RGB values are converted to visible color after being fed directly into the RGB pixels. Such direct feeding, absent additional processing as described herein, may not be suitable for n-primaries display systems, wherein n>3, because the RGB data represents only three primaries and cannot be fed directly to all the n (n>3) primaries of the wide gamut display.

The methods described herein may be used to convert any known format of input data into a YCC or RGB data format, or other suitable format, that may be used as input to n-primaries separator 416. While some of the steps of the method of the invention may be implemented by suitable adaptation of components used in display devices, other steps of the methods of the invention may be embodied in components of other parts of the reproduction chain, e.g., in DVD players, set-off boxes for DVB, or any other device used in conjunction with a specific type of display system. In general, the invention does not require fundamental hardware changes to existing displays; however, certain aspects of some embodiments of the invention, such as expansion of the color gamut of the input data, may require additional software and/or hardware adaptation of the image reproduction and display system being used. For example, a functionality of increasing color saturation may be achieved by manipulating the data at the YCbCr level, as well as by referencing the data being processed to RGB reference points defining a color gamut larger than gamut defined by the standard set, e.g., the Rec. 709 RGB reference set.

In embodiments of the invention, the three-dimensional (three-primary) color space (e.g., YCbCr, XYZ or other) can be converted to a corresponding n-primaries space in various ways. A straightforward conversion from the three-dimensional color space to more-than-three primaries format is possible, but requires intense computation. Therefore, it is desirable to lower the amount of time required for such computations. One method of reducing computation time includes mapping the color data to the n-primaries data using a "dense" look-up table, which stores a set of n-primaries values for each set of values in the triad input format, e.g., XYZ, YCbCr, or any other input triad format. However, since the color data is typically stored in bit-sequence format, e.g., an eight-bit format, such a look-up table may require a prohibitively large amount of memory. For example, assuming that the levels of each primary are kept at 8-bit resolution, the amount of memory required to store the look-up-table is $256^3 \times n \times 8$ bit=$16,777,216 \times n$ (Bytes) ? $16 \times n$ MB, wherein n is the number of primaries. Therefore, an embodiment of the invention provides a way to significantly reduce memory usage, as described in detail below.

An embodiment of the system and method of the present invention enables a reduction of the three-dimensional conversion computation into a two-dimensional computation, thus considerably reducing the amount of memory required for the look-up-table. In this embodiment, the seemingly inherent problem of requiring either a highly memory-consuming look-up table or a highly time-consuming computation process is resolved by implementing an efficient combination of a reasonably sized look-up table coupled with a reduced-complexity computation process. The processing and look-up functions may be executed by known hardware and/or software components, such as a graphics processor, graphics card, microprocessor and memory, or other known components. While in one embodiment the look up function is performed before the processing function, they may be performed in different orders or in parallel.

Conversion of data to constants for use with display primaries, as described herein, is preferably carried out by a processor or data converter which is part of a display system according to an exemplary embodiment of the present invention. Such a processor or data converter may be any conventional data processing device, such as a microprocessor, "computer on a chip," or graphics processor. For example, embodiments of the invention, as described herein, can be implemented using dedicated ASICs with internal memory. Alternatively, embodiments of the invention can be implemented using, for example, a controller that controls data extraction from external memory devices, as are known in the art, that store the different LUTs. Alternatively, the algorithms can be implemented using programmable gate arrays (FPGA), such as those available form Altera, Xilinx or others, or using any other combinations of hardware and/or software known in the art that are suitable for executing these algorithms.

Embodiments of the method of the present invention may use n+1 two-dimensional look-up tables, each of which has a predefined size, for example, $256^2 \times 8$ bit, assuming an 8 bit resolution for indexing and output. In this example, the total amount of memory that would be required to execute the method is $(n+1)*256^2$ Bytes, which roughly equals $64*(n+1)$ kB. This amount of memory is sufficiently small to be stored on a standard memory card, as is known in the art. For example, for n=6, the amount of memory typically required would be approximately 448 kB to store the n+1 LUTs, which is a relatively small amount of memory for digital video applications. Other suitable methods of arranging and storing the data may also be used in conjunction with the invention.

It should be appreciated that, in addition to the data formats described herein, the systems and methods of the present invention may be used, with appropriate changes, to convert any other known video data format.

Figure 5A:
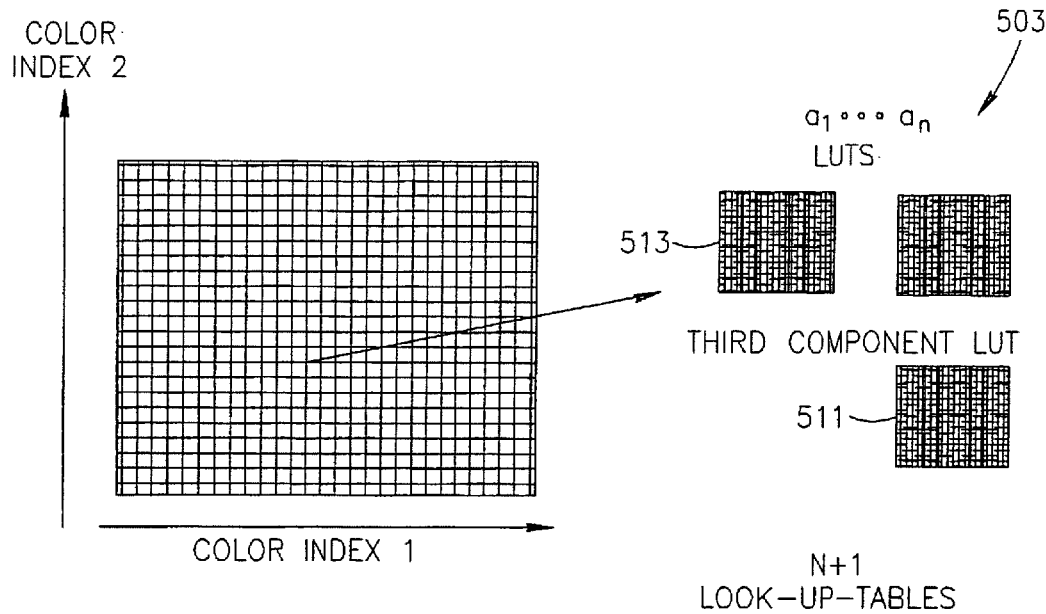
FIG. 5A is a schematic illustration of a two dimensional sub-space component, mapped from a three-dimensional color space input, in accordance with an embodiment of invention.

FIG. 5A schematically illustrates a two dimensional sub-space of the three-dimensional color space mapped, for example, to a 256×256 grid, i.e., 8-bits for each coordinate in the two-dimensional space. In alternate embodiments of the invention, other data formats and/or dimensions may be used. For each grid point in the two-dimensional grid ("two-dimensional color sub-space"), a specific set of coefficients of the n-primaries used by the monitor is pre-calculated, as well as a value for a third, scaleable coordinate of the color space, which corresponds to the specific combination of primary coefficients. These values are stored in n+1 look-up-tables (LUTs) 503, including one LUT 511 for the scaleable third coordinate and n LUTs 513 for the n primaries, respectively, at entries corresponding to the grid point representing the specific color combination. Alternatively, depending on specific design considerations, all n+1 LUTs may be combined into one, larger, LUT containing $(n+1)*k$ bit (wherein "k" denotes the bit-length of each data entry, e.g., k=8) for each of the grid points, whereby the $(n+1)*k$ bit value includes all the $a_1 \ldots a_n$ values as well as the scalable third component. It should be noted that each point in the two-dimensional color sub-space is defined by two parameters, which are reconstructed using n-primaries (preferably, n>3). Because the number of possible combinations of the sets of coefficients is infinite, additional constraints may be necessary in order to determine appropriate combinations. Such constraints may be dependent on the specific system design and its intended application. It should be noted, however, that the choice of the two-dimensional color sub-space is not arbitrary and certain constraints may be invalid, e.g., constraints that do not allow straightforward scalability of the third color component. For example, a chromaticity diagram may be selected as a valid two-dimensional sub-space for presenting specific color combinations within a known spectrum. In such case, the scaleable third color coordinate can be measured in terms of brightness, and specific coefficients may be calculated to achieve an optimal spectral match. Other examples are detailed below. It should be appreciated, however, that the invention is not limited to the specific designs and constraints of the color sub-spaces described herein.

Figure 5B:
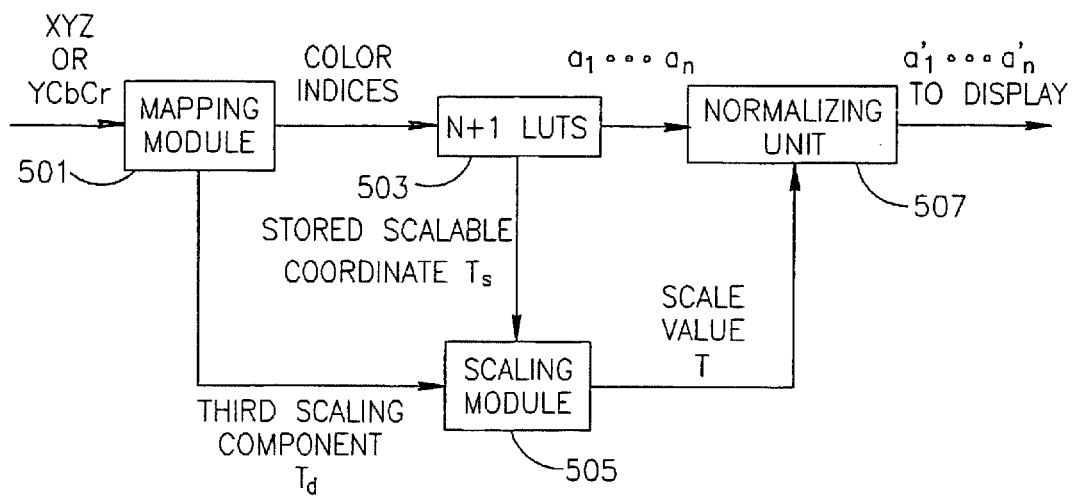
FIG. 5B is a block diagram illustrating a data flow scheme used in conjunction with a conversion method and system according to an exemplary embodiment of the invention.

FIG. 5B schematically illustrates data flow in the n-primaries separator 416 of FIG. 4. Input data, in YCbCr or XYZ format, is received by a mapping module 501, which calculates the two-dimensional sub-space color indices as well as the third, scaling, component, denoted $T_d$. The indices are received as input by the n+1 LUTs 503 discussed above, and are used to retrieve the information stored at corresponding locations in LUTs 503. The data for scaling component, $T_d$, and the stored value for the third, scaleable coordinate, denoted $T_s$, which is retrieved from third component LUT 511 (FIG. 5A), are received by a scaling unit 505. The resulting, scaled value, T, is provided as input to a normalizing module 507, which also receives as input the n primary coefficient values, $a_1 \ldots a_n$, retrieved from LUTs 513 (FIG. 5A).

Using those inputs, normalizing module 507 computes the values, $a_1' \ldots a_n'$, sent to the display.

In an embodiment of the invention, data in linear YCbCr form is transformed to Hue, Y (luminance) and Saturation ("HYS") space, as follows:

$$C_R/iC_B = S \cdot Y \cdot e^{iH}$$

wherein H is defined by the angle of a given position in the Cb—Cr plane relative to an origin, which may be set at Cb,Cr=0, typically after removing a predetermined bias, e.g., a 128 bias (assuming a standard 8-bit format wherein zero chromaticity values for Cb and Cr are situated at binary code 128), and S is defined by the magnitude of the given position, normalized to the value of Y. Alternatively, the hue and the saturation values may be defined based on a XYZ space, by converting them to Lu*v* and deriving the hue and saturation using computations known in the art. Alternatively, the XYZ data can be mapped directly to an u'-v' space, or other space, using a suitable projecting transformation, as is known in the art, wherein u' and v' can be used to calculate saturation and hue, as is known in the art. Another possibility is to define the Hue and Saturation based on the dominant wavelength and purity of each color combination after the XYZ data is projected on a x-y chromaticity plane. Any other suitable methods for calculating saturation and hue, as are known in the art, may also be used in conjunction with the present invention.

The HYS three-dimensional color space is divided into two parts, namely, a two-dimensional H-Y sub-space, and S as a third, scaleable, dimension. The H-Y sub-space may be mapped to a 256×256 grid, i.e., 8-bits for each coordinate in the two-dimensional sub-space. For each grid point, the method of the invention may calculate a maximum saturation, $S_o$, determined by the specific type of monitor or display used, and a set of corresponding coefficients, $a_1 \ldots a_n$, for the n-primaries used by the monitor. Further, a set of coefficients, $w_1 \ldots w_n$, for the white point (Cb,Cr=0) at maximum brightness (Y=1) may also be calculated and stored.

Figure 6:
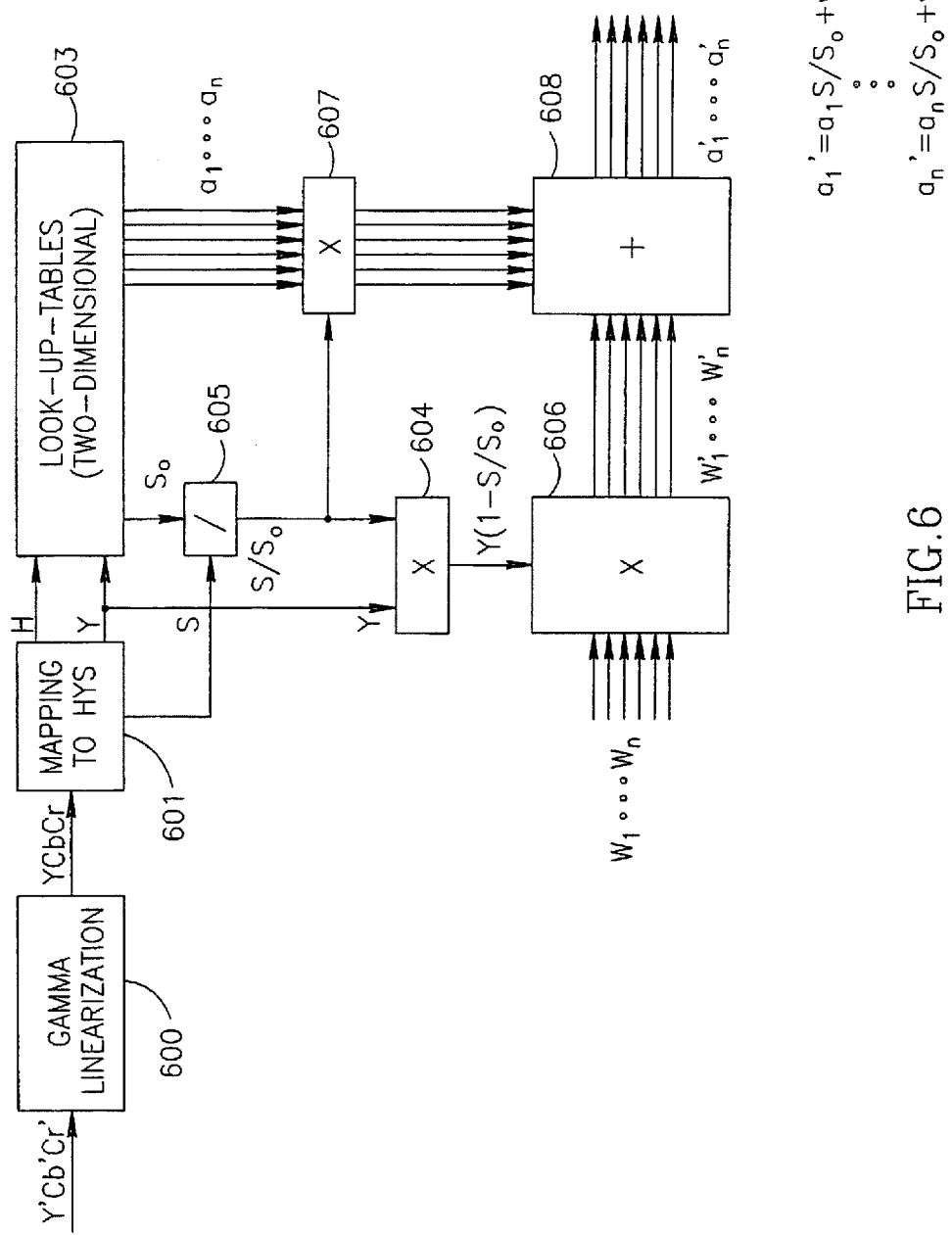
FIG. 6 is a block diagram illustrating a data flow scheme used in conjunction with a conversion method and system according to a further exemplary embodiment of the invention.

FIG. 6 schematically illustrates a data flow scheme for a conversion method according to an embodiment of the invention. The input video data, such as YCbCr or other data format (e.g., RGB), is converted to HYS coordinates as described above using a mapping unit 601, which may include a specifically adapted implementation of unit 501 in FIG. 5B. The H and Y coordinates, each of which may be represented by an 8-bit sequence, are used as indices to n+1 two-dimensional look-up-tables 603, which may include a specifically adapted implementation of LUTs 503 in FIG. 5B. Using the H and the Y indices, the appropriate set of pre-calculated coefficients $a_1 \ldots a_n$ and maximum saturation $S_o$ are recalled. A gray-level value at the required level of brightness Y is calculated by multiplying Y by the predefined set of white point coefficients $w_1 \ldots w_n$ using a multiplier unit 606, and scaling the result based on the most saturated color at the same H and Y value given by the retrieved combination $a_1 \ldots a_n$. A scaling parameter, defined by the ratio $S/S_o$, may be calculated by a scaling unit 605, which may include a specifically adapted implementation of scaling unit 505 in FIG. 5B. A normalizing unit 607 multiplies the values of $a_1 \ldots a_n$ corresponding to the most saturated color at the specific hue and brightness level of each pixel by $S/S_o$, which represents the required saturation for that pixel, thereby normalizing the $a_1 \ldots a_n$ values to values representing the required saturation for that pixel. An addition unit 608 adds to the normalized values a fraction $(1-S/S_o)$ of gray-level signal at the same level of brightness Y. The resultant adjusted coefficients, $a_1' \ldots a_n'$, provided as input to the n-primary display, are thus computed as follows:

$$\begin{pmatrix} a_1' \\ \ldots \\ \ldots \\ \ldots \\ a_n' \end{pmatrix} = \left(1 - \frac{S}{S_0}\right) \cdot Y \cdot \begin{pmatrix} w_1 \\ \ldots \\ \ldots \\ \ldots \\ w_n \end{pmatrix} + \frac{S}{S_0} \cdot \begin{pmatrix} a_1 \\ \ldots \\ \ldots \\ \ldots \\ a_n \end{pmatrix}$$

An advantage of this method of processing is that the Y component remains unchanged. Therefore, the luminance data of the image is the same as in a corresponding gray level representation of the image. Further, the fact that saturation S is inherently lower than maximum saturation $S_o$ (i.e., $S/S_o<1$) ensures that all input data is properly mapped to a valid device output. In an embodiment of the invention, the saturation of different color values may be modified by applying a 1-D LUT to saturation S.

Figure 7:
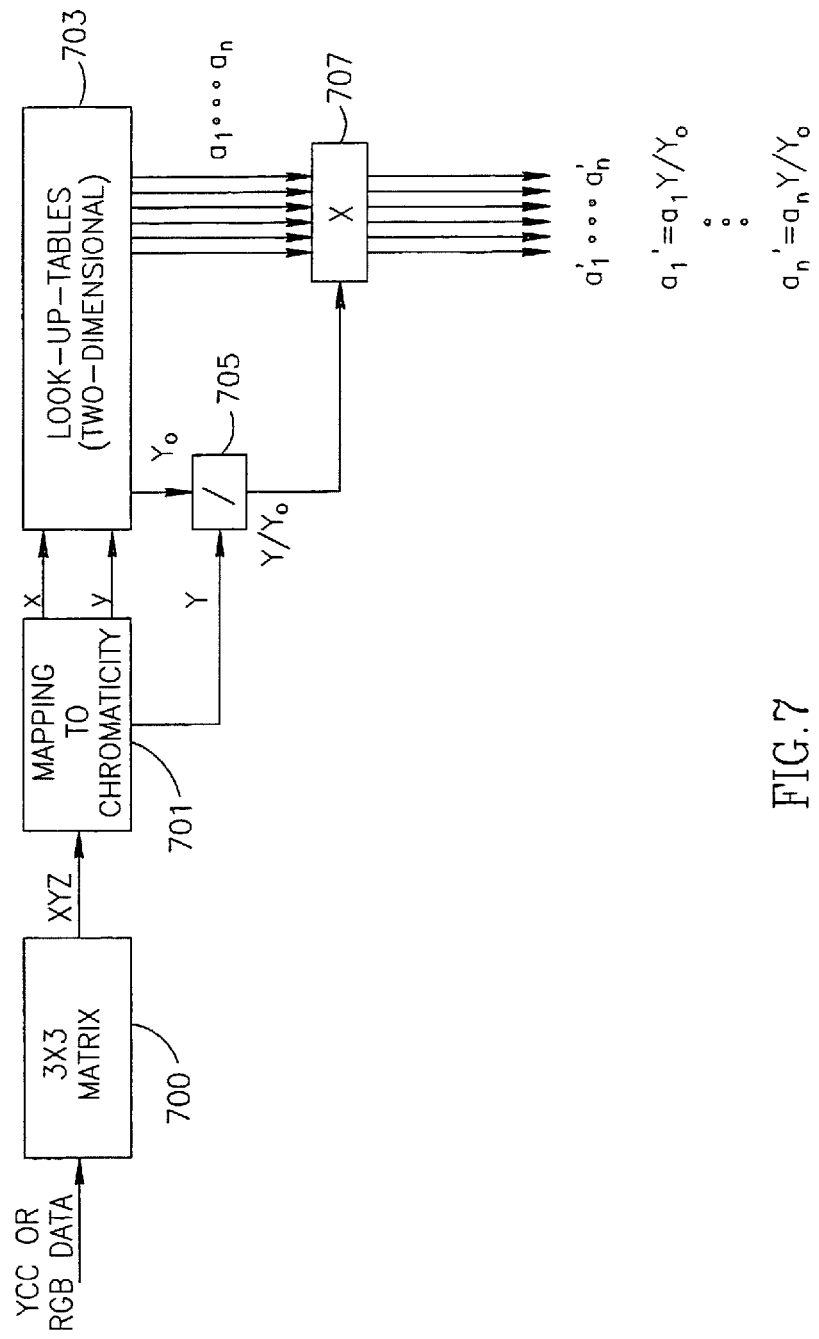
FIG. 7 is a schematic block diagram illustrating part of a method in accordance with an exemplary embodiment of the invention, including mapping of a x-y or equivalent chromaticity sub-space.

FIG. 7 schematically illustrates a further embodiment of the system and method of the invention, wherein a x-y chromaticity sub-space (or other equivalent sub-space, e.g., r-g, u'-v' or Cr/Y-Cb/Y sub-spaces) is used as the two-dimensional sub-space. The third, scaleable dimension in this case is the brightness level, Y, and the x-y chromaticity sub-space is mapped to a predefined grid, for example, a 256×256 grid, based on 8-bits for each coordinate in the two-dimensional chromaticity space. In alternate embodiments, other data formats and dimensions may be used. For each grid point, the method of the invention calculates and stores a set of coefficients of the n-primaries used by the monitor, as well as a brightness level, $Y_o$, of the specific color combination. Various constraints may be applied to determine a specific combination of n-primaries (preferably, n>3), the color of which corresponds to the color of the point on the chromaticity grid. According to one variation of this embodiment, the set of coefficients is calculated to yield an optimal spectral match. Alternatively, the set of coefficients is calculated to yield the highest brightness for the resulting color. Alternatively, the set of coefficients is calculated to yield optimal dynamic range for the resulting color. Any other suitable constraints may be applied in accordance with specific system requirements.

The data flow scheme for conversion according to this embodiment is illustrated in FIG. 7. Input data, such as RGB (clipped or unclipped) or YCbCr data, is converted to XYZ (or equivalent space) coordinates by a conversion matrix 700, for example, a 3×3 matrix. The XYZ data is mapped on the x-y (or u'-v' or other) chromaticity sub-space using a mapping unit 701, which may include a specifically adapted implementation of unit 501 in FIG. 5B. Alternatively, for a YCbCr input, the mapping may be performed on a Cr/Y-Cb/Y sub-space, in which case the YCbCr data is directly converted to the sub-space, obviating the need for XYZ conversion. Alternatively, RGB data input may be mapped on a r-g sub-space, wherein the RGB data may be directly converted to the r-g sub-space as follows:

$$r = \frac{R}{R+G+B}$$

$$g = \frac{G}{R+G+B}$$

The x-y (or u'-v' or Cb/Y—Cr/Y or other) coordinates, each of which may be represented by an 8-bit sequence, are used as indices to n+1 look-up tables 703, analogous to the LUTs 503 discussed above with reference to FIG. 5B. A divider unit 705, which may include a specifically adapted implementation of unit 505 in FIG. 5B, divides the Y value (scaling component) of each coordinate pair (pixel) of the incoming signal by the corresponding $Y_o$ value (scaleable coordinate) of the same coordinate pair, which value may be retrieved from a corresponding look-up-table. The resulting ratio is applied as a conversion factor to coefficients e.g., the coefficients are multiplied by the $Y/Y_o$ ratio using a multiplier 707, generating a new set of coefficients, $a_1' \ldots a_n'$, which determine the n primary values received by the display. The functionality of multiplier 707 may include a specifically adapted implementation of normalizing unit 507 in FIG. 5B. Other processing steps and/or a different sequence of steps may be used in conjunction with embodiments of the invention, depending on specific design requirements. In alternate embodiments of the invention, the conversion process may be modified in different manners to obtain a desirable balance between the computation complexity and the size and number of look-up tables being used. For example, various operations, such as multiplication and division, can be replaced by LUTs that contain corresponding multiplication or division tables, whereby the multiplication or division calculations can be executed by retrieving data from the LUTs. Alternatively, in order to avoid the use division and/or multiplication operations, which operations may be relatively costly in terms of processing capacity, the values stored in the LUTs may be replaced by logarithmic equivalents of those values, or the values in the LUTs may be converted to logarithmic equivalents using one-dimensional LUTs, as is known in the art. This may allow replacement of the relatively costly division/multiplication operations with less-costly subtraction/addition operations, respectively. Reverse-logarithmic functions, which can be implemented using one-dimensional LUTs, may then be applied to the resultant values, thereby translating the results back to the desired non-logarithmic form.

Following is a general description of a method of calculating the n+1 look-up tables desribed above, in accordance with an embodiment of the invention, followed by specific examples, which are presented by way of example only and are not meant to be limiting. The physical properties of the specific monitor or display being used, in particular the specific primary colors used by the monitor or display, are relevant factors for the method of the invention. Since typical monitor opertaion is based on additive color combinations, the calculation of the look-up-tables is typically performed in an additive color space. The primaries are defined in absolute physical terms, e.g., in a colorimetric XYZ values, or by their spectra. If the primary colors are defined, for example, by vectors in the XYZ space, the color of an additive mixture of the primaries is given by:

$$\begin{pmatrix} X_C \\ Y_C \\ Z_C \end{pmatrix} = \sum_{i=1}^{n} a_i \begin{pmatrix} X_i \\ Y_i \\ Z_i \end{pmatrix}$$

wherein the color of the additive mixture is denoted by the subscript "c" and the primaries are denoted by the subscript "i" (i=1 . . . n). The $a_i$'s are the coefficients of the linear combination defining the color mixture. In practice, the values of the $a_i$ coefficients are in the range of 0-1. If the primary colors are defined in terms of their spectra, additive combination may be computed as follows:

$$\Psi(\lambda) = \sum_{i=1}^{n} a_i \varphi_i(\lambda)$$

wherein $\Psi$ is the specific spectrum to be reproduced and $\varphi_i$ are the primaries spectra.

The indices to the look-up-tables and the additional constraints may be defined in terms of the absolute additive color space being used, for example, the two dimensional H-Y color sub-space described above, with S as the third color component. The H-Y space discussed above is based on YCbCr data. For simplicity of calculation the method of the invention may include transforming the colorimetric XYZ space values to corresponding YCbCr values, and using the YCbCr values to calculate corresponding H, Y and S values. Alternatively, the YCbCr data can be converted directly into spectra values as explained below. The following linear transformation may be used to convert the XYZ data to linear YCbCr data:

$$\begin{pmatrix} Y \\ C_b \\ C_r \end{pmatrix} = \begin{pmatrix} 0 & 1 & 0 \\ K & L & M \\ D & E & F \end{pmatrix} \cdot \begin{pmatrix} X \\ Y \\ Z \end{pmatrix} \Rightarrow \begin{pmatrix} C_b/Y \\ C_r/Y \end{pmatrix} = \begin{pmatrix} K & L & M \\ D & E & F \end{pmatrix} \cdot \begin{pmatrix} X/Y \\ 1 \\ Z/Y \end{pmatrix}$$

wherein K, L, M, D, E, and F are constants determined by the relationship between YCbCr and XYZ as defined by the RGB reference points.

Given that:

$$\begin{pmatrix} \frac{C_b}{Y} \\ \frac{C_r}{Y} \end{pmatrix} = \begin{pmatrix} S\sin H \\ S\cos H \end{pmatrix}$$

the following values may be computed:

$$\tan(H) = \frac{C_b}{C_r} = \frac{K \cdot X + L \cdot Y + M \cdot Z}{D \cdot X + E \cdot Y + F \cdot Z}$$

$$S = \frac{\sqrt{C_b^2 + C_r^2}}{Y}$$
$$= \frac{\sqrt{(K \cdot X + L \cdot Y + M \cdot Z)^2 + (D \cdot X + E \cdot Y + F \cdot Z)^2}}{Y}$$

The above formulae can be usefully re-represented in terms of the primaries and their relative contributions, as follows:

$$\tan(H) = \frac{C_b}{C_r} = \frac{\sum_{i=1}^{n} a_i (K \cdot X_i + L \cdot Y_i + M \cdot Z_i)}{\sum_{i=1}^{n} a_i (D \cdot X_i + E \cdot Y_i + F \cdot Z_i)}$$

-continued $$S = \frac{\sqrt{C_b^2 + C_r^2}}{Y}$$

$$= \frac{\sqrt{\left\{\sum_{i=1}^{n} a_i(K \cdot X_i + L \cdot Y_i + M \cdot Z_i)\right\}^2 + \left\{\sum_{i=1}^{n} a_i(D \cdot X_i + E \cdot Y_i + F \cdot Z_i)\right\}^2}}{\sum_{i=1}^{n} a_i Y_i}$$

This last re-representation is based on the definition of brightness Y discussed above, namely, $$Y = \sum_{i=1}^{n} a_i Y_i.$$

In an embodiment of the invention, $S_0$, the maximum value for saturation S at certain hue H and brightness Y values may be determined, as discussed above. The values of the $a_1 \ldots a_n$ coefficients are calculated that provide a maximum S given by:

$$S = \frac{\sqrt{C_b^2 + C_r^2}}{Y}$$

$$= \frac{\sqrt{\left\{\sum_{i=1}^{n} a_i(K \cdot X_i + L \cdot Y_i + M \cdot Z_i)\right\}^2 + \left\{\sum_{i=1}^{n} a_i(D \cdot X_i + E \cdot Y_i + F \cdot Z_i)\right\}^2}}{\sum_{i=1}^{n} a_i Y_i}$$

Under the constraints that $0 \leq a_i \leq 1$, and that the $a_i$'s fulfill the above equations for tan(H) and Y, the equations for tan(H) and Y can be rewritten as follows:

$$\tan(H) = \frac{C_b}{C_r} = \frac{\sum_{i=1}^{n} a_i(K \cdot X_i + L \cdot Y_i + M \cdot Z_i)}{\sum_{i=1}^{n} a_i(D \cdot X_i + E \cdot Y_i + F \cdot Z_i)}$$

$$Y = \sum_{i=1}^{n} a_i Y_i$$

Further, to differentiate between the two possible solutions of tan(H), the method of the invention may require that Cr be either positive or negative. To perform optimization in accordance with the above parameters, the method of the invention may determine the appropriate $a_i$ coefficients using various techniques, as are known in the art.

To implement a method based on maximum saturation in accordance with an embodiment of the invention, as shown in FIG. 6, it may be necessary to compute the coefficients, $w_1 \ldots w_n$, which yield a white point with the maximum possible brightness. The white point color, which is an additive mixture of all the primaries, is given by:

$$\begin{pmatrix} X_W \\ Y_W \\ Z_W \end{pmatrix} = \sum_{i=1}^{n} w_i \begin{pmatrix} X_i \\ Y_i \\ Z_i \end{pmatrix}$$

wherein Xw, Yw, and Zw are the colorimetric XYZ coordinates of the white point. The $w_i$'s in the above formula are the coefficients of the linear combination, i.e., relative weights of the different primaries, and are thus in the range of 0-1.

In chromaticity terms, the above white point formula may be reduced to the following equation:

$$\frac{Y_W}{y_W} \begin{pmatrix} x_W \\ y_W \\ z_W \end{pmatrix} = \sum_{i=1}^{n} w_i \begin{pmatrix} X_i \\ Y_i \\ Z_i \end{pmatrix}$$

wherein $x_w$, $y_w$ and $z_w$ denote the chromaticity values of the white point.

Given that:

$$Y_W = \sum_{i=1}^{n} w_i Y_i$$

This equation may be re-written as follows:

$$0 = \sum_{i=1}^{n} w_i \left[ \begin{pmatrix} X_i \\ Y_i \\ Z_i \end{pmatrix} - \frac{Y_i}{y_W} \begin{pmatrix} x_W \\ y_W \\ z_W \end{pmatrix} \right]$$

$$\begin{pmatrix} x_W \\ y_W \\ z_W \end{pmatrix} = \frac{\sum_{i=1}^{n} w_i \begin{pmatrix} X_i \\ Y_i \\ Z_i \end{pmatrix}}{\sum_{i=1}^{n} w_i (X_i + Y_i + Z_i)}$$

This last equation may be re-represented, using well-known techniques, as follows:

$$0 = \sum_{i=1}^{n} w_i \left[ \begin{pmatrix} X_i \\ Y_i \\ Z_i \end{pmatrix} - (X_i + Y_i + Z_i) \times \begin{pmatrix} x_W \\ y_W \\ z_W \end{pmatrix} \right]$$

The values of $w_i$ are calculated that yield the maximum value of $$Y_W = \sum_{i=1}^{n} w_i Y_i$$

(representing maximum brightness), and at the same time fulfill the following constraints:

$$0 \leq w_i \leq 1 \quad \text{for all } i = 1 \ldots n$$

$$0 = \sum_{i=1}^{n} w_i [X_i - (X_i + Y_i + Z_i) x_W]$$

$$0 = \sum_{i=1}^{n} w_i [Y_i - (X_i + Y_i + Z_i) y_W]$$

-continued $$0 = \sum_{i=1}^{n} w_i [Z_i - (X_i + Y_i + Z_i) z_W]$$

The two constraints on the X and the Y coordinates are obtained from the white point equation (in chromaticity terms) above; the constraint on the Z coordinate is consequently also fulfilled (when two constrains out of the three are fulfilled, the third one is inherently fulfilled, because the sum of x, y, and z always equals 1). To perform optimization in accordance with the above parameters, an embodiment of the method of the invention may determine the appropriate $w_i$ coefficients using various techniques, for example, by linear programming using Lagrange multipliers for the equality constraints.

Another example of calculating the values for the n+1 LUTs is demonstrated by an embodiment of the invention, wherein the requirement imposed is to obtain a maximum brightness level, $Y_o$. In this embodiment, the two-dimensional color sub-space used may be a chromaticity space (e.g. x-y, u-v, or other), and the additional, scaleable, coordinate is the brightness level Y. For each point in the chromaticity space, the n+1 LUTs contains the combination of display primaries that yields maximum brightness, with the required chromaticity, as well as the value of the maximum brightness. This technique of "filling-in" the LUTs is analogous to the technique described above for calculating the white point; however, in this case the technique is applied to a color (color mixture) whose chromaticity corresponds to a point on the chromaticity space (grid). The calculation also yields the parameter of maximum brightness, $Y_o$, for each point.

An embodiment of the method of the invention may also include determining an optimal spectral match, as follows. A system according to an embodiment of the invention receives source data in a given format, such as RGB, YCC or CMYK, or any other format known in the art, and converts the source data into primary levels fa; display. The data is converetd to a chromaticity space (e.g., r-g space for RGB input or x-y, u-v, or other), which is used as the two-dimensional color sub-space. For each point in the chromaticity sub-space, the two coordinates representing the point are used as indices into LUTs containing the predefined $a_1 \ldots a_n$ coefficient values of the primaries that yield the best spectral match at a pre-defined brightness level, typically the maximum possible brightness. The pre-defined brightness level for that point is also kept in a LUT. The third color component in the data stream, that of the brightness, is used to normalize the $a_1 \ldots a_n$ coefficients to the required brigthness level.

The values $a_1 \ldots a_n$ that yield an optimal spectral match may be calculated as follows. In one step, a relationship is defined between a possible input datum (e.g., a triad of values) and a respective spectrum. In a second step, the method calculates the values of the display primaries that yield an optimal spectral match.

To execute the first step, a model relating the RGB (or YCbCr) values to a respective spectrum is required, for example, the following translation may be used:

$$\Psi(\lambda) = I(\lambda) \cdot T(\lambda)$$

$$T(\lambda) = 10^{-D_R \alpha_C(\lambda)} \cdot 10^{-D_G \alpha_M(\lambda)} \cdot 10^{-D_B \alpha_Y(\lambda)}$$

$$Q = \int \Psi(\lambda) f_Q(\lambda) d\lambda \quad Q = R, G, B$$

wherein $\alpha_C$, $\alpha_M$, $\alpha_Y$ are absorbance curves for the complementary primaries, Cyan, Magenta and Yellow, respectively, which produce the RGB colors by subtractive color creation, as is known in the art; $D_R$, $D_G$, and $D_B$, respectively, denote the color densities of R, G and B, respectively; and $f_Q$ denotes weighting functions for R, G, and B, respectively.

Using this model, there is a one-to-one correspondence between a set of RGB values and the respective D values. Since the spectrum is uniquely determined by specifying the densities, according the formula given above, a one-to-one correspondence from a set of RGB values and the spectrum they define is obtained. For the purpose of this description, it is assumed that equal densities of the different primary colors result in a neutral gray appearance. Under this assumption, an increase of density for all the primary colors by the same amount implies a corresponding decrease of brightness, but no change in chromaticity, namely, all the primary color levels are divided by the same constant. As an example, an r-g two-dimensional color sub-space may be used with Y as the third, scaleable coordinate. For any index point, which may be defined by chromaticity coordinates (r,g), the method computes a corresponding (r,g,b) triad as follows:

$$(r,g,b) = (r,g,1-r-g)$$

All colors $(R,G,B) = C^*(r,g,b)$ wherein C is a constant have the same chromaticity coordinates (remember the definition of chromaticity r=R/(R+G+B) etc.) The maximum brightness is computed as follows:

$$(R,G,B) = (r,g,b)/\max(r,g,b)$$

assuming that the maximum value allowed for R, G, and B is one; otherwise the corresponding factor should be entered. From the RGB values, a spectrum $\psi(\lambda)$ may be computed. An additive combination of the primaries spectra $\phi_i(\lambda)$ is given by:

$$\Xi(\lambda) = \sum_{i=1}^{n} a_i \varphi_i(\lambda)$$

Here, $\Xi(\lambda)$ is the spectrum created by the multi-primary display, and $\phi_i(\lambda)$ is the spectra of the display primaries. The value $\lambda$ is measured in, for example, discrete units from the range $\lambda_{min} - \lambda_{max}$ and therefore, the continuous functions E and p can be repalced by m-dimensional vectors as follows:

$$\vec{\Xi} = \sum_{i=1}^{n} a_i \vec{\varphi}_i \Rightarrow \Xi_k = \sum_{i=1}^{n} a_i \varphi_{ik} \Rightarrow \vec{\Xi} = \Phi^+ \vec{a}$$

wherein $\Phi$ is an n*m matrix containing the m-dimensional vectors representing the spectra of the n primaries. Multiplying from the left by $\Phi$ we obtain:

$$\Phi \vec{\Xi} = (\Phi \Phi^+) \vec{a} \Rightarrow \vec{a} = (\Phi \Phi^+)^- \Phi \vec{\Xi}$$

using the fact the $\Phi \Phi^+$ is a square n*n matrix. By setting $\Xi = \Psi$, where $\Psi$ is the required spectrum, the method of the invention computes a solution for coefficients $a_1 \ldots a_n$. By choosing for each set of chromaticity coordinates (r,g) a spectrum $\psi(\lambda)$ such as its brightness is maximal, the n+1 LUTs can be created. As discussed above, starting from the (r,g) coordinates, an RGB triad with maximal brightness is calculated, from which the densities are estimated and the spectrum $\psi(\lambda)$ is evaluated.

After completing the above computations, which may be performed, for example, offline, each grid point is associated with n respective values for the n primaries, as well as a respective value for the third, scaleable, coordinate. These values may be stored in n+1 two-dimensional look-up tables, n tables for the coefficients $a_1, \ldots a_n$, and one for the respective third coordinate. Other methods of storing the data may be used in conjunction with the invention, depending on the specific organizational schemes and formats used by the system.

Figure 8A:
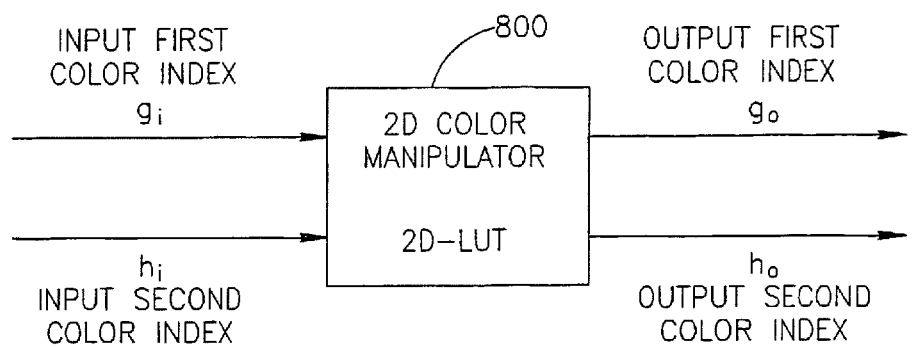
FIG. 8A is a schematic illustration of data conversion in accordance with a further exemplary embodiment of the invention, using two-dimensional look-up-tables (LUTs)
Figure 8B:
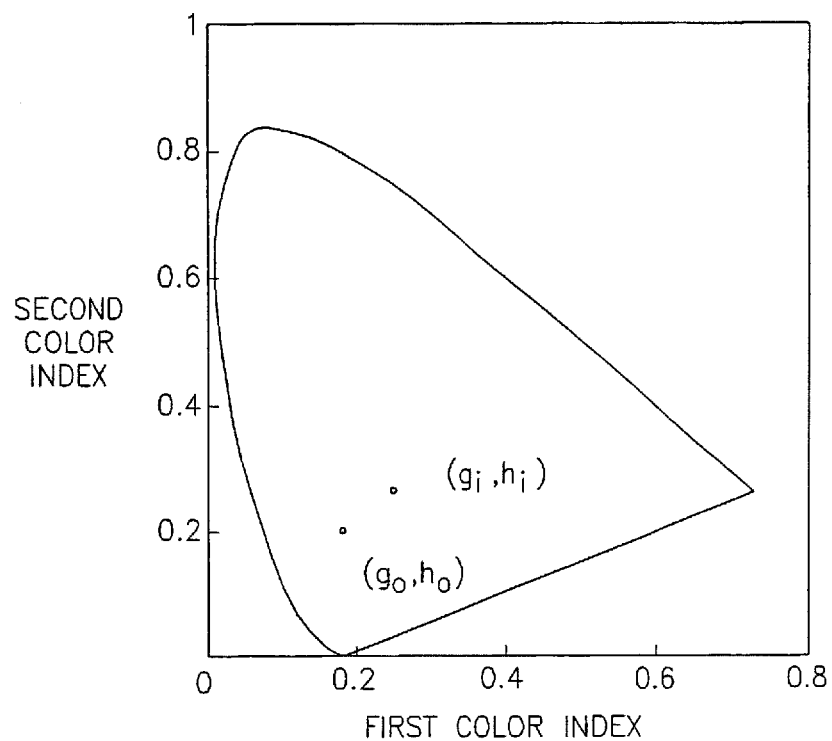
FIG. 8B is a schematic diagram illustrating conversion of indices in a chromaticity space in accordance with the embodiment of FIG. 8A.

FIG. 8A schematically illustrates data manipulation in accordance with an embodiment of the present invention, wherein two-dimensional look-up-tables (LUTs) are used to manipulate data for the n-primaries display, instead of the one-dimensional LUTs described above. FIG. 8B schematically illustrates manipulation of indices on a chromaticity diagram, in accordance with the embodiment of FIG. 8A. An advantage of the two-dimensional LUTs manipulation method, in accordance with this embodiment of the invention, is that the method allows for two-dimensional color manipulation, in contrast to the exclusively one-dimensional manipulation performed by existing video and graphic boards using one-dimensional LUTs. According to an aspect of this embodiment of the invention, input color indices (coordinates), $h_i$, $g_i$ (e.g., $x_i$, $y_i$ in the x-y chromaticity plane), can be manipulated to provide new indices, $h_o$, $g_o$ (e.g., $x_o, y_o$ in the x-y chromaticity plane), which represent a new position (color) on the chromaticity plane, as shown schematically in the chromaticity diagram of FIG. 8B. This manipulation may be performed by a manipulation unit 800, as illustrated schematically in FIG. 8A. The new indices may be used instead of the original indices as inputs to the n+1 two-dimensional LUTs in FIG. 5B. Thus, manipulation unit 800 may be placed, for example, between the mapping unit 501 and the n+1 LUTs 503 of FIG. 5B.

An embodiment of the method of the invention allows further color manipulation in the chromaticity plane. The input chromaticity coordinates, e.g., (x,y), may be manipulated into other coordinates, for example, $(x_2, y_2)$, allowing color manipulation operations that are otherwise not possible, at video speeds, in existing display devices. For example, such manipulation enables increasing saturation only for predefined hue values while reducing saturation for other hue values. In an embodiment of the invention, the saturation and hue values can be adjusted as desired in any predefined region of the color space by applying specific functions. Similar processes may be used to manipulate or modify the signals in the H-Y space or other spaces, for example, the brightness of certain hue values may be increased while decreasing the brightness other hue values.

It will be appreciated by persons skilled in the art that the present invention is not limited by what has been particularly shown and described hereinabove and with reference to the accompanying drawings. Rather, the invention is limited only by the following claims.

What is claimed is:

1. A method of converting color image data comprising:
   receiving an input signal including a plurality of input data in a three-dimensional color space format;
   converting said three-dimensional color space format input color data into input data in a two-dimensional color space format; and
   processing the two-dimensional color space format input data in the two-dimensional color space format to obtain respective two-dimensional color space format output data, at least a portion of said two-dimensional color space format output data being different from said two-dimensional color space format input data.

2. The method of claim 1, wherein the two-dimensional color space is the x-y chromaticity plane.

3. The method of claim 1, wherein the two-dimensional color space is the u-v chromaticity plane.

4. The method of claim 1, wherein the two-dimensional color space is the r-g chromaticity plane.

5. The method of claim 1, wherein the two-dimensional color space is the H-Y space.

6. The method of claim 1, wherein said plurality of input data in the three-dimensional color space format represents three-dimensional color image pixel data including out-of-range pixel data, said out-of-range pixel data being outside a color gamut reproducible by a three-primary additive display compliant with a color display standard, and wherein the two-dimensional color space format output data comprises display data for each of the primary colors of a wide color gamut display, at least a portion of which corresponds to at least some of said out-of-range pixel data.

7. The method of claim 6, wherein processing the two-dimensional color space format input data to obtain respective two-dimensional color space format output data comprises expanding a color gamut of the two-dimensional color space format input data, such that at least a portion of said two-dimensional color space format output data corresponds to at least some of said out-of-range pixel data.

8. The method of claim 1, further comprising based on said two-dimensional color space format output data, generating a wide color gamut input signal suitable for driving said wide gamut color display.

9. The method of claim 1, wherein the three-dimensional color space represents linear intensities.

10. The method of claim 1, wherein the three-dimensional color space represents non-linear intensities.

11. The method of claim 1, wherein processing the two-dimensional color space format input data in the two-dimensional color space to obtain respective two-dimensional color space format output data is based on a look-up-table.

12. A device for converting color image data comprising:
    a converter configured to receive an input signal including a plurality of input data in a three-dimensional color space format, wherein said converter is further configured to convert said three-dimensional color space format input color data into input data in a two-dimensional color space and process the two-dimensional color space format input data in the two-dimensional color space to obtain respective two-dimensional color space format output data, at least a portion of said two-dimensional color space format output data being different from said two-dimensional color space format input data.

13. The device of claim 12, wherein the two-dimensional color space is the x-y chromaticity plane.

14. The device of claim 12, wherein the two-dimensional color space is the u-v chromaticity plane.

15. The device of claim 12, wherein the two-dimensional color space is the r-g chromaticity plane.

16. The device of claim 12, wherein the two-dimensional color space is the H-Y space.

17. The device of claim 12, wherein said plurality of input data in the three-dimensional color space format represents three-dimensional color image pixel data including out-of-range pixel data, said out-of-range pixel data being outside a color gamut reproducible by a three-primary additive display compliant with a color display standard, and wherein the two-dimensional color space format output data comprises display data for each of the primary colors of a wide color gamut display, at least a portion of which corresponds to at least some of said out-of-range pixel data.

18. The device of claim 17, wherein said converter is further configured to process the two-dimensional color space format input data to obtain respective two-dimensional color space format output data by expanding a color gamut of the two-dimensional color space format input data, such that at least a portion of said two-dimensional color space format output data corresponds to at least some of said out-of-range pixel data.

19. The device of claim 12, wherein said converter is further configured, based on said two-dimensional color space format output data, to generate a wide color gamut input signal suitable for driving said wide gamut color display.

20. The device of claim 12, wherein the three-dimensional color space represents linear intensities.

21. The device of claim 12, wherein the three-dimensional color space represents non-linear intensities.

22. The device of claim 12, wherein said converter is configured to process the two-dimensional color space format input data in the two-dimensional color space to obtain respective two-dimensional color space format output data based on a look-up-table.

* * * * *